US009443457B2

(12) United States Patent
Kamada et al.

(10) Patent No.: US 9,443,457 B2
(45) Date of Patent: Sep. 13, 2016

(54) DISPLAY CONTROL DEVICE, DISPLAY CONTROL METHOD, AND RECORDING MEDIUM

(71) Applicant: SONY CORPORATION, Tokyo (JP)

(72) Inventors: Yasunori Kamada, Kanagawa (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 14/087,207

(22) Filed: Nov. 22, 2013

(65) Prior Publication Data
US 2014/0146024 A1    May 29, 2014

(30) Foreign Application Priority Data

Nov. 29, 2012    (JP) ................................. 2012-260596

(51) Int. Cl.
| | |
|---|---|
| *G06F 3/147* | (2006.01) |
| *G09G 5/14* | (2006.01) |
| *G09G 3/20* | (2006.01) |
| *G06F 3/14* | (2006.01) |

(52) U.S. Cl.
CPC .............. *G09G 3/20* (2013.01); *G06F 3/1446* (2013.01); *G09G 5/14* (2013.01); *G09G 2340/0464* (2013.01); *G09G 2340/0492* (2013.01)

(58) Field of Classification Search
CPC ..................... G09G 2320/10; G09G 2340/12; G09G 2370/08; G09G 3/20; G09G 5/14; G09G 2340/0464; G09G 2340/0492; G09G 3/1446; G09F 9/12; H04N 5/4403
USPC ........................................................ 345/204
See application file for complete search history.

(56) References Cited

U.S. PATENT DOCUMENTS

| | | | | |
|---|---|---|---|---|
| 5,825,347 A | * | 10/1998 | Prinsen .................... | G09F 19/12 248/918 |
| 7,015,924 B2 | * | 3/2006 | Thomason ............. | G06T 19/006 345/582 |
| 8,502,788 B2 | * | 8/2013 | Cho ........................ | G06F 1/1626 345/173 |
| 9,214,137 B2 | * | 12/2015 | Bala ......................... | G06F 3/147 |
| 2007/0143082 A1 | * | 6/2007 | Degnan .................... | G06T 11/60 703/1 |
| 2010/0157063 A1 | * | 6/2010 | Basso ........................ | G09F 9/35 348/169 |
| 2012/0057174 A1 | * | 3/2012 | Briggs .................. | G01C 15/002 356/603 |
| 2012/0206419 A1 | * | 8/2012 | Lee .......................... | G06F 3/012 345/179 |

(Continued)

FOREIGN PATENT DOCUMENTS

| | | | |
|---|---|---|---|
| EP | 2336847 A1 | * | 6/2011 |
| JP | 2001-155179 | | 6/2001 |
| JP | 2011-050577 | | 3/2011 |

OTHER PUBLICATIONS

Kong et al, "Development of the FishBowl Game Employing a Tabletop Tiled Display Coupling with Mobile Interfaces", Journal of Korea Game Society, v. 10, No. 2, p. 57-66, 2010.*

(Continued)

*Primary Examiner* — Julie Anne Watko
(74) *Attorney, Agent, or Firm* — Paratus Law Group, PLLC

(57) ABSTRACT

There is provided a display control device including a setting unit that sets a type and display position of a pseudo object, an acquiring unit that acquires a parameter for implementing a function of the set pseudo object in one or more devices placed near the set display position, and a display control unit that displays the pseudo object according to the parameter on a display unit, the display unit being one of the one or more devices.

16 Claims, 21 Drawing Sheets

(56) References Cited

U.S. PATENT DOCUMENTS

2013/0335445 A1* 12/2013 Bala .................. G06F 3/147
   345/633
2014/0146024 A1* 5/2014 Kamada ............. G09G 3/20
   345/204

OTHER PUBLICATIONS

"Judy's TenKey", Cnet Review (http://download.cnet.com/Judys-TenKey/3000- 20417_4- 10893669.html). May 30, 2010.*
Bramwell, "Watch TV in Second Life", (http://www.eurogamer.net/articles/news081106secondlife) Aug. 11, 2006.*
Debik, "Das Oszilloskop, ein Beispiel zur Gestaltung von Lehr- und Lernsoftware fur virtuelle Laboratorien", Masters thesis, Technische Universitat Berlin, publication date unknown (first known archiving 2004).*
"KnigaByte—Virtual bookshelf [MIBF-2009]", (https://www.youtube.com/watch?v=Th9sX17N1Ms) 2009.*
"Virtual Cork Bulletin Boards for Teams", (https://teamingrocks.wordpress.com/2011/05/10/virtual-cork-bulletin-board-for-teams/) May 10, 2011.*
"Second Life—Watching TV in my pad", (https://www.youtube.com/watch?v=EMZ9ivTYwmE) Jun. 2, 2008.*
Kjeldsen et al, "Interacting with Steerable Projected Displays", Proc. 5th International Conf. on Automatic Face and Gesture Recognition, May 20-21, 2002.*
iHandy Carpenter, "iHandy Level Free", (https://appfelstrudel.com/id/299852753/ihandy- level- free.html) Dec. 22, 2008.*
Gates, Bill, "On Microsoft Surface", (https://www.youtube.com/watch?v=K0i35C5X26o) May 30, 2007.*
"Remote Control Car in Second Life", Jul. 2, 2012, https://www.youtube.com/watch?v=pzCRtXHW3nl.*
"Eta Galleon RC", Mar. 5, 2011, http://etacarver.com/wpress/?p=563.*
Definition of "embedded", Oxford English Dictionary, printed Jan. 27, 2016 (first published 1993).*

* cited by examiner

DISPLAY CONTROL DEVICE, DISPLAY CONTROL METHOD, AND RECORDING MEDIUM

CROSS REFERENCE TO RELATED APPLICATIONS

This application claims the benefit of Japanese Priority Patent Application JP 2012-260596 filed Nov. 29, 2012, the entire content of which is incorporated herein by reference.

BACKGROUND

The present disclosure relates to a display control device, a display control method, and a recording medium.

Recently, there exists technology that constructs and displays a virtual space, and provides a game or virtual experience. For example, Japanese Unexamined Patent Application Publication No. 2011-50577 describes a user performing an operation with a touch pen or the like on an "object" in a virtual game space displayed on a screen, thereby activating a function of the "object" (a video display of blinking, opening/closing, left/right movement, shaking, or the like).

Also, Japanese Unexamined Patent Application Publication No. 2001-155179 discloses a system that creates a virtual three-dimensional domestic space and arranges three-dimensional images domestic-related products on a display, and moves a client's avatar within the domestic space to provide a simulated experience to check whether a television viewing angle or the interior design effects are suitable,

SUMMARY

However, the technologies described in Japanese Unexamined Patent Application Publication No. 2011-50577 and Japanese Unexamined Patent Application Publication No. 2001-155179 above are for temporarily experiencing a virtual space on the display of a game console or personal computer (PC), and there is no discussion from the perspective of using a pseudo object in a virtual space similarly to a real-world object.

Thus, the present disclosure proposes a new and improved display control device, display control method, and recording medium enabling the use of a pseudo object similarly to a real-world object.

According to an embodiment of the present disclosure, there is provided a display control device including a setting unit that sets a type and display position of a pseudo object, an acquiring unit that acquires a parameter for implementing a function of the set pseudo object in one or more devices placed near the set display position, and a display control unit that displays the pseudo object according to the parameter on a display unit, the display unit being one of the one or more devices.

According to an embodiment of the present disclosure, there is provided a display control method including setting a type and display position of a pseudo object, acquiring a parameter for implementing a function of the pseudo object in one or more devices placed near the display position, and applying control to display the pseudo object according to the parameter acquired in the acquiring step on a display unit, the display unit being one of the one or more devices.

According to an embodiment of the present disclosure, there is provided a non-transitory computer-readable recording medium having a program recorded thereon, the program causing a computer to function as a setting unit that sets a type and display position of a pseudo object, an acquiring unit that acquires a parameter for implementing a function of the pseudo object in one or more devices placed near the display position, and a display control unit that applies control to display the pseudo object according to the parameter acquired by the acquiring unit on a display unit, the display unit being one of the one or more devices.

According to an embodiment of the present disclosure as described above, it becomes possible to use a pseudo object similarly to a real-world object.

DETAILED DESCRIPTION OF THE EMBODIMENT(S)

Figure 1:
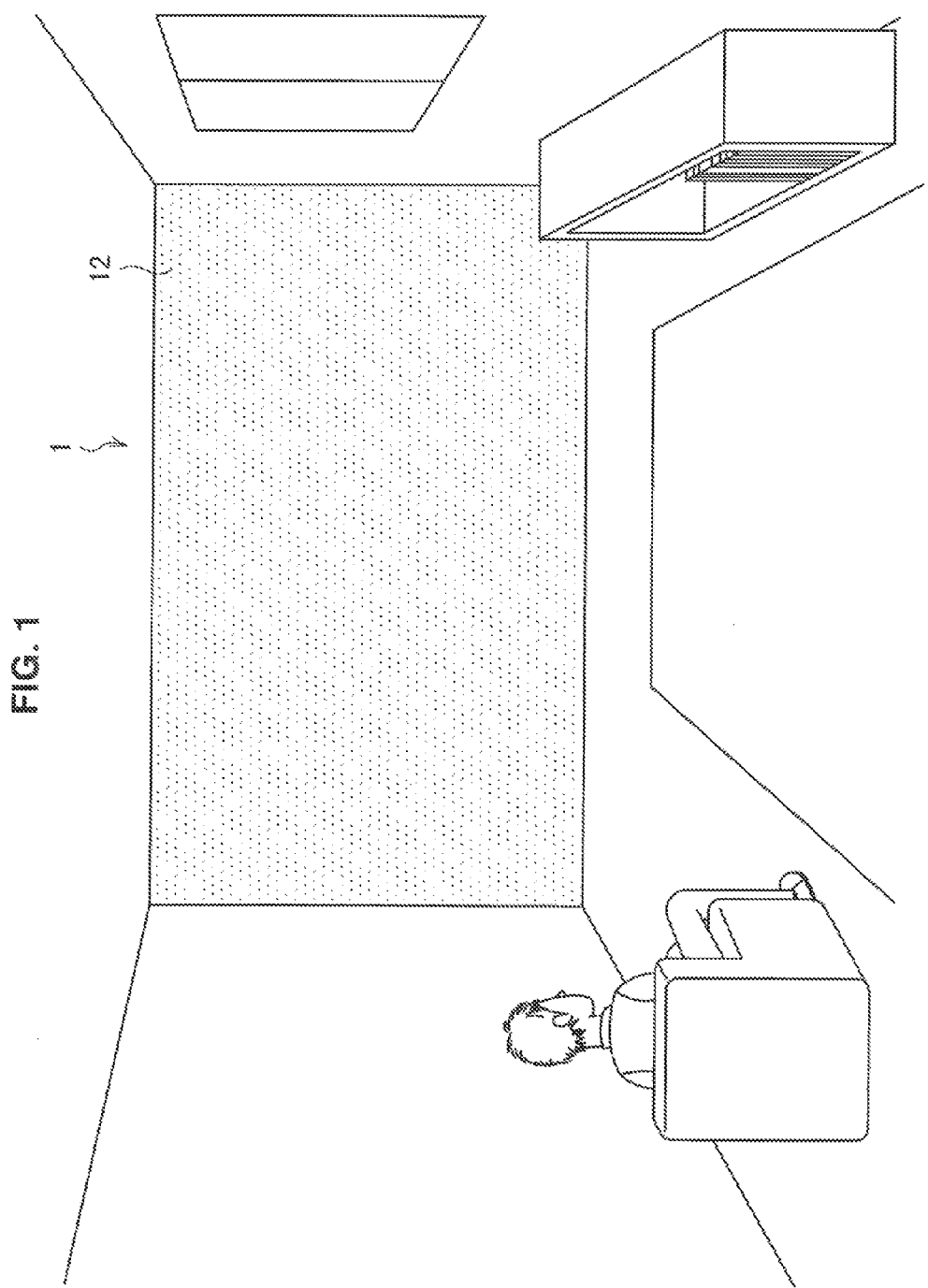
FIG. 1 is a diagram summarizing a control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Summary of control system according to an embodiment of the present disclosure
  1-1. Configuration
  1-2. Operational process
2. Embodiments
  2-1. First embodiment
  2-2. Second embodiment
  2-3. Third embodiment
  2-4. Fourth embodiment
  2-5. Fifth embodiment
  2-6. Sixth embodiment
  2-7. Seventh embodiment
  2-8. Eighth embodiment
  2-9. Ninth embodiment
  2-10. Tenth embodiment
  2-11. Eleventh embodiment
  2-12. Twelfth embodiment
3. Conclusion <1. Summary of Control System According to an Embodiment of the Present Disclosure>

First, a control system according to an embodiment of the present disclosure will be summarized with reference to FIG. 1.

FIG. 1 is a diagram summarizing a control system according to an embodiment of the present disclosure. As illustrated in FIG. 1, a control system according to the present embodiment is able to play back content such as movies/TV programs/games on a big screen with a display control device 1 that includes a display unit 12 provided on one entire wall of a room (a wall display).

Recent televisions are becoming larger, and it is possible for a user to view a picture on a large screen. However, there is a difficulty in that the size of a television that may be installed in a room is restricted by other furniture and the like. Also, depending on the time of viewing or the content, the viewing style provided by a big screen may not be desirable in some cases. Furthermore, in the case of placing a large television, the wide space occupied by the device becomes wasted when the television is not being viewed. Also, in cases where the design of a large television is at odds with other furniture or the atmosphere, the interior design effects may be significantly degraded.

Accordingly, the display control device 1 according to the present embodiment includes a display unit 12 provided on one entire wall as illustrated in FIG. 1, making it possible to play back a big-screen picture while saving the space for installing a large television.

Furthermore, the display control device 1 according to the present embodiment displays images (pseudo objects) of furniture installed on a wall in a living environment (such as a television, clock, and a sound device) or facilities provided on a wall (such as a window or lighting) on the display unit 12, and implements behavior similar to real-world furniture and facilities. Thus, it is possible to use desired furniture and facilities as appropriate, and effectively utilize wall space. Also, in a control system according to the present embodiment, a user is able to freely modify the layout and design of furniture and facilities according to his or her wishes.

The above thus summarizes a control system according to an embodiment of the present disclosure. Next, an internal configuration of a display control device 1 included in a control system according to the present embodiment, and an operational process of the control system, will be successively described.

[1-1. Configuration]

Figure 2:
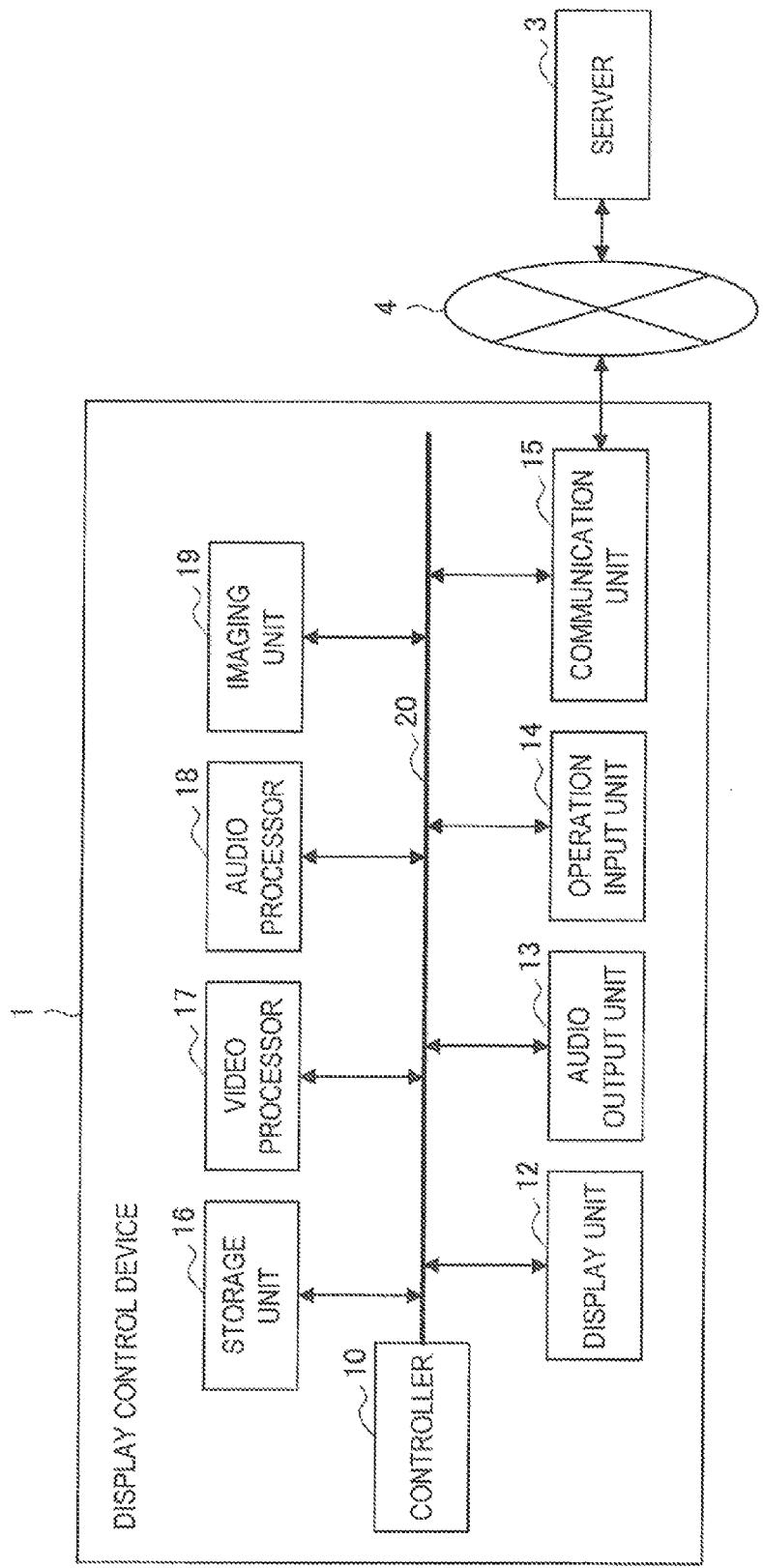
FIG. 2 is a block diagram illustrating an exemplary internal configuration of a display control device according to an embodiment of the present disclosure.

FIG. 2 is a block diagram illustrating an exemplary internal configuration of a display control device 1 according to the present embodiment. As illustrated in FIG. 2, a display control device 1 according to the present embodiment includes a controller 10, a display unit 12, an audio output unit 13, an operation input unit 14, a communication unit 15, a storage unit 16, a video processor 17, an audio processor 18, and an imaging unit 19, which are connected by a bus 20.

The controller 10 sends commands to the respective component of the display control device 1, and controls the display control device 1 overall. For example, in response to a user operation input from the operation input unit 14, the controller 10 controls the display unit 12 and causes a pseudo object to be displayed. Note that a specific functional configuration of the controller 10 according to the present embodiment will be discussed later with reference to FIG. 3.

The display unit 12 is provided on a wall as illustrated in FIG. 1, and includes functions for outputting still images or moving images in accordance with instructions from the controller 10. Specifically, the display unit 12 according to the present embodiment may display pseudo objects and arrange content (such as photos, movies, or TV programs) within pseudo objects. Also, all or part of a picture (image) displayed on the display unit 12 is processed by the video processor 17.

The display unit 12 may be realized with a single liquid crystal panel, organic EL panel, LED display panel, rear-projection TV, or front-projection TV. The display unit 12 may also be realized with an arrangement of multiple liquid crystal panels, organic EL panels, LED display panels, rear-projection TVs, or front-projection TVs.

The audio output unit 13 includes functions for outputting an audio signal in accordance with instructions from the controller 10. All or part of an audio signal output by the audio output unit 13 is processed by the audio processor 18. Also, the audio output unit 13 is realized by a speaker, an amp, and a digital-to-analog conversion circuit (D/A converter).

The operation input unit 14 accepts the input of a user operation, and outputs the input user operation to the controller 10. Specifically, the operation input unit 14 may receive and accept a signal emitted from a remote control operated by a user as the input of a user operation. Also, the operation input unit 14 may be realized by a positional input device such as a touch panel integrated into the display unit 12. Furthermore, the operation input unit 14 may be realized by a microphone that picks up nearby voices as well as a voice recognition unit, and accept user instructions by voice.

The communication unit 15 is a communication interface that transmits and receives data to and from an external device. As illustrated in FIG. 2, the communication unit 15 according to the present embodiment connects to a server 3 via a network 4, transmitting and receiving data as appropriate. For example, the communication unit 15, following instructions from the controller 10, receives from the server 3 content parameters and resource data to be output from the display unit 12 and the audio output unit 13.

Herein, in this specification, content resource data includes an image of a pseudo object, to be displayed on the display unit 12, a still image/moving image to be placed within a pseudo object, and an audio signal to be output from the audio output unit 13. Also, content parameters refer to information that is associated with a pseudo object, and is used to implement the functions of that pseudo object in each device (such as the display unit 12 and the audio output unit 13).

For example, in the case where the pseudo object is a television, there may be an associated parameter that indicates the area of a television image in which a playback image is to be displayed. Also, in the case where the pseudo object is a speaker, there may be an associated parameter that indicates how to control an audio output unit 13 placed near the display position of a speaker image. Furthermore, in the case where the pseudo object is storage furniture, there may be an associated parameter that indicates what is being stored in what part of a storage furniture image.

The storage unit 16 provides a storage area for various programs and a working memory area that the controller 10 uses to execute respective processes. Also, the storage unit 16 according to the present embodiment stores pseudo object parameters and resource data, and images/sound content to be output from the display unit 12 or the audio output unit 13.

The video processor 17 includes functions for generating a picture to display on the display unit 12. Specifically, the video processor 17 according to the present embodiment, following instructions from the controller 10, generates a pseudo object to display on the display unit 12, on the basis of parameters and resource data acquired from the storage unit 16 or the communication unit 15.

The audio processor 18 includes functions for generating an audio signal to be output from the audio output unit 13. Specifically, the audio processor 18, according to the present embodiment, following instructions from the controller 10, generates an audio signal on the basis of parameters and resource data acquired from the storage unit 16 or the communication unit 15.

The imaging unit 19 includes an image sensor, imaging optics that include an imaging lens, and a captured image signal processor. The imaging unit 19 outputs data of a captured image in the form of a digital signal. Note that the image sensor is realized by a charge-coupled device (CCD) imager or a complementary metal-oxide-semiconductor (CMOS) imager, for example. A Mic 24 is a voice pickup unit that picks up nearby voices, and outputs voice data in the form of digital signals.

Also, the imaging unit 19 according to the present embodiment may be realized by a one or more image sensors and imaging lenses embedded in the display unit 12, or may be installed on the ceiling or a wall different from the wall on which the display unit 12 is provided to enable capture of the vicinity of the display unit 12 or the entire room.

(Functional Configuration of Controller 10)

Figure 3:
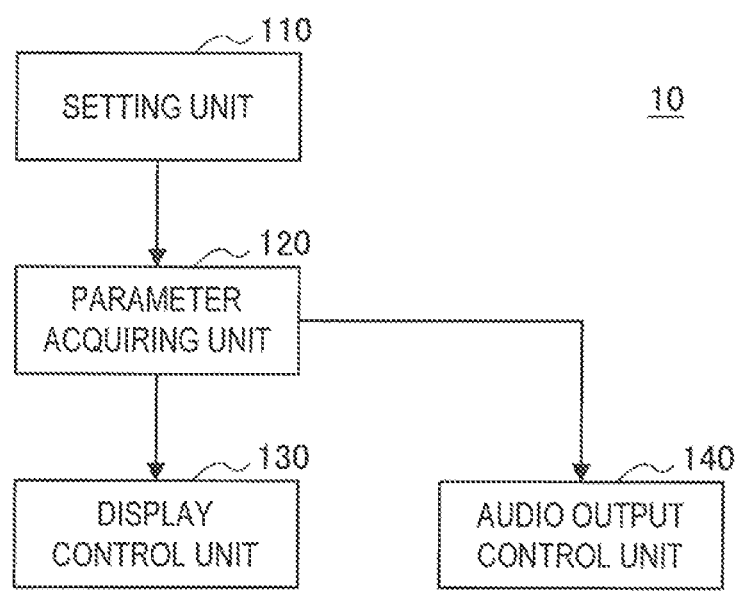
FIG. 3 is a block diagram illustrating a functional configuration of a controller according to an embodiment of the present disclosure.

The above thus describes an internal configuration of the display control device 1 according to the present embodiment. Next, a functional configuration of the above controller 10 will be described with reference to FIG. 3. FIG. 3 is a block diagram illustrating a functional configuration of a controller 10 according to the present embodiment.

As illustrated in FIG. 3, the controller 10 according to the present embodiment functions as a setting unit 110, a parameter acquiring unit 120, a display control unit 130, and an audio output control unit 140.

The setting unit 110 sets the type of pseudo object and a display position for the image of the pseudo object on the display unit 12. For example, the setting unit 110 may set a preregistered object type and position according to an interior design theme, or set an object type and position according to a user operation. The setting unit 110 may also set the display size of a pseudo object.

The parameter acquiring unit 120 acquires parameters for implementing the functions of a pseudo object set by the above setting unit 110 in devices placed near the display position set by the above setting unit 110 (the display unit 12, the audio output unit 13, and the imaging unit 19, for example). For example, the parameter acquiring unit 120 acquires parameters from the storage unit 16, or from the server 3 via the communication unit 15. Herein, a function of a pseudo object indicates behavior that is similar (equal) to the same object in the real world.

The display control unit 130 applies control to display an image of a pseudo object at a display position set by the above setting unit 110. An image of a pseudo object is acquired from the storage unit 16, or from the server 3 via the communication unit 15. Also, the display control unit 130 is capable of modifying factors such as the type, size, and display position of a pseudo object to display on the display unit 12, according to a user operation.

The display control unit 130 also conducts pseudo object display control according to parameters acquired by the above parameter acquiring unit 120. Specifically, in the case where the pseudo object is a television, for example, the display control unit 130 places a playback screen of user-selected image content in a display screen portion (placement area) in an image of the television according to a parameter.

Note that the display control unit 130 may also modify the display position of a pseudo object according to the position of a real object existing near the display unit 12, such that the pseudo object to display on the display unit 12 does not overlap with the real object.

The audio output control unit 140, following parameters acquired by the above parameter acquiring unit 120, applies control to output designated audio content (an audio signal) from the audio output unit 13. Specifically, in the case where the pseudo object is a speaker, for example, the audio output control unit 140 applies control to output sound content selected by the user at a level corresponding to factors such as the speaker size/type/performance according to the parameters.

Note that the audio output control unit 140 may also cause the audio processor 18 to process an audio signal to output from the audio output unit 13.

[1-2. Operational Process]

Figure 4:
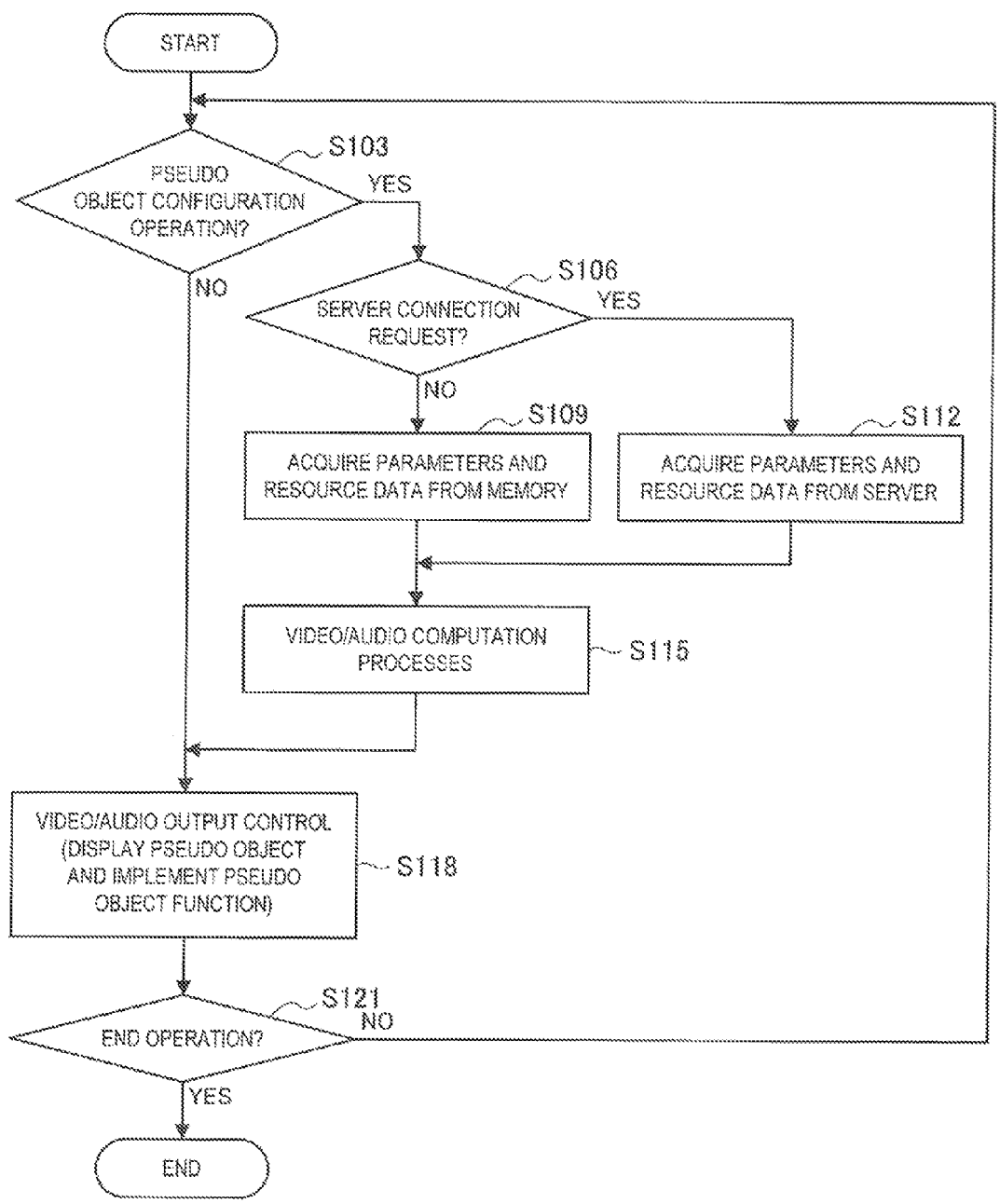
FIG. 4 is a flowchart illustrating an operational process of a control system according to an embodiment of the present disclosure.

Next, an operational process of a control system according to an embodiment of the present disclosure will be described. FIG. 4 is a flowchart illustrating an operational process of a control system according to an embodiment of the present disclosure.

As illustrated in FIG. 4, first, in step S103, the setting unit 110 of the controller 10 determines whether or not a user operation that sets the type and display position of a pseudo object (configuration operation) has been input from the operation input unit 14.

Subsequently in the case of a configuration operation (S103/Yes), in step S106, the controller 10 determines whether or not to issue a server connection request.

Next, in the case of a server connection (S106/Yes), the parameter acquiring unit 120 of the controller 10 connects to the server 3 from the communication unit 15 via the network 4, and acquires set pseudo object parameters and resource data from the server 3.

On the other hand, in the case of no server connection (S106/No), the parameter acquiring unit 120 of the controller 10 acquires set pseudo object parameters and resource data from the storage unit 16 (memory).

Subsequently, in step S115, the controller 10 conducts video and audio computation processes according to the acquired parameters. Specifically, the controller 10 computes a display signal for the display unit 12, and computes an audio signal for the audio output unit 13. The controller 10 may also cause the video processor 17 and the audio processor 18 to execute these computation processes.

Subsequently, in step S118, the controller 10 conducts video output control with respect to the display unit 12, or audio output control with respect to the audio output unit 13. Specifically, the controller 10 according to the present embodiment applies control to display an image of a pseudo object on the display unit 12, and additionally controls a designated device (such as the display unit 12, the audio output unit 13, or the imaging unit 19) to implement a function of that pseudo object.

For example, in the case where the pseudo object is a television, the display control unit 130 of the controller 10 applies control to place a playback screen of user-selected image content in a display screen portion of a television to display on the display unit 12. Thus, it is possible for a pseudo television displayed on the display unit 12 to play back image content similarly to a real-world television.

Also, in the case where the pseudo object is a speaker, the audio output control unit 140 of the controller 10 applies control such that sound content selected by the user is output from an audio output unit 13 placed near the speaker to display on the display unit 12. Thus, it is possible for a pseudo speaker displayed on the display unit 12 to play back sound content similarly to a real-world speaker.

Note that in the above S103, in the case where there is no pseudo object configuration operation (pseudo object modification instructions) (S103/No), in step S118, the controller 10 continues the current video and audio output control.

Additionally, the controller 10 repeats the above S103 to S118 until instructions for ending operation (power-off instructions or instructions to end pseudo object display, for example) are given in step S121.

The above thus describes an operational process of a control system according to an embodiment of the present disclosure. As discussed above, a pseudo object to display on the display unit 12 is variously imagined to be a television, speaker, or the like. Hereinafter, the display and functional implementation of specific pseudo objects will be described using multiple embodiments.

<2. Embodiments>

[2-1. First Embodiment]

Figure 5:
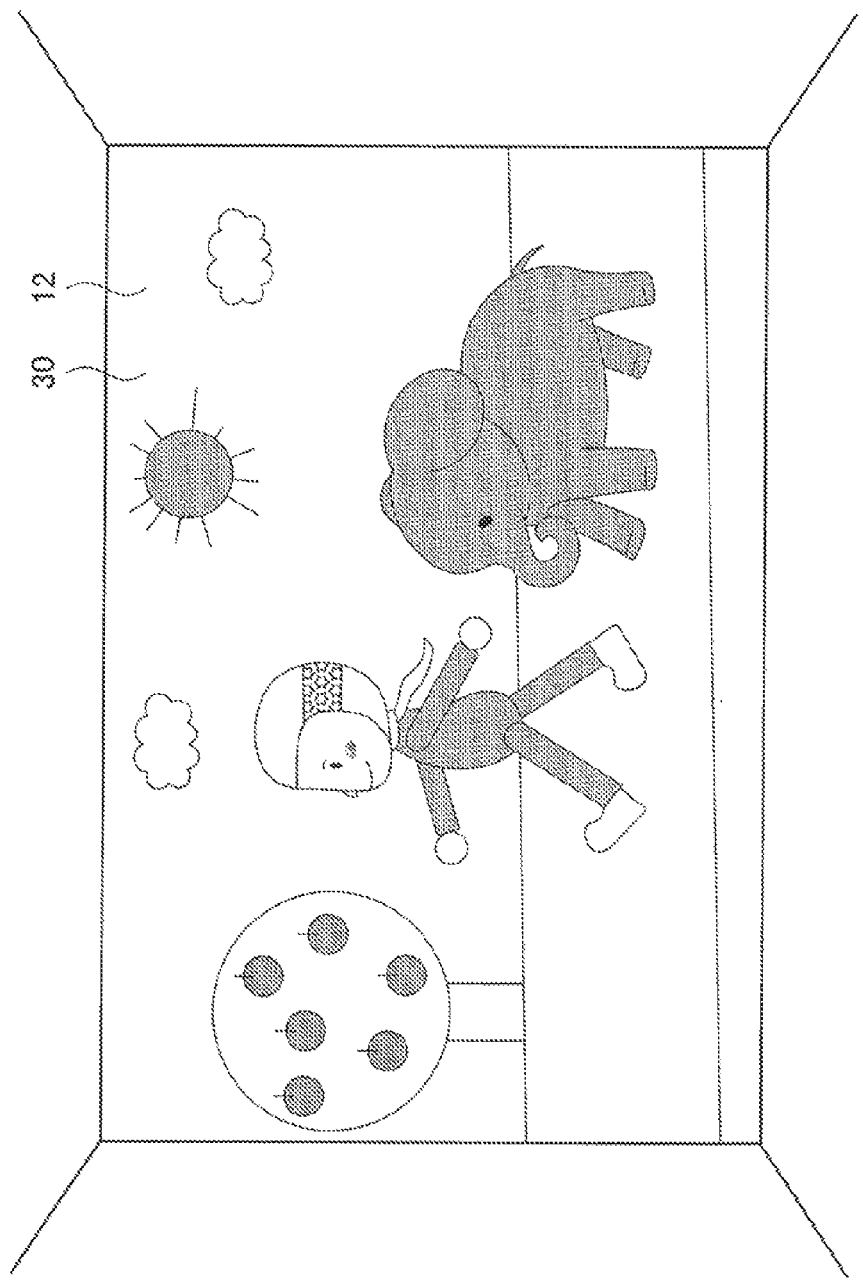
FIG. 5 is a diagram for explaining an exemplary display of image content according to the first embodiment of the present disclosure.

FIG. 5 is a diagram for explaining an exemplary display of image content according to the first embodiment. As illustrated in FIG. 5, the display control device 1 displays user-selected image content 30 on the entire display unit 12 provided on a wall. Thus, a user is able to view the image content 30 on a big screen.

Note that although the image content 30 is being displayed on the entire display unit 12 in the example illustrated in FIG. 5, the display control device 1 may also display a pseudo television on the entire display unit 12, and place the image content 30 in a display screen portion of that television.

[2-2. Second Embodiment]

Although the above first embodiment displays the image content 30 on the entire display unit 12 provided on a wall, it is anticipated that various furniture may be installed on or against the wall in a living environment. In this case, part of the image content 30 may be hidden from view by the furniture. Accordingly, in the second embodiment, the display control device 1 modifies the display position according to the position of a real object existing near the display unit 12, such that the image content 30 or a pseudo object to display on the display unit 12 does not overlap with the real object. Hereinafter, such a case will be specifically described with reference to FIG. 6.

Figure 6:
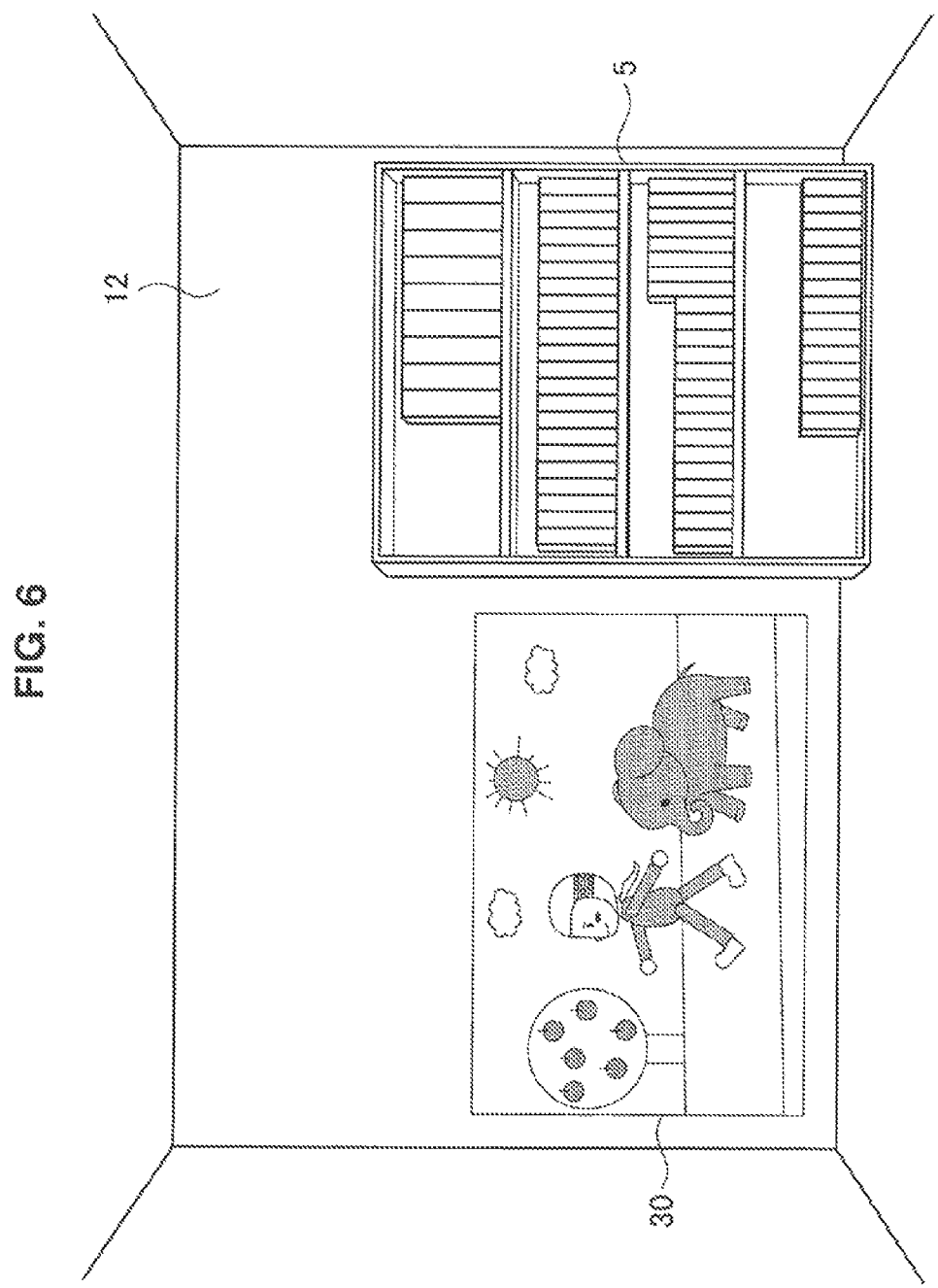
FIG. 6 is a diagram for explaining an exemplary display of image content according to the second embodiment of the present disclosure.

FIG. 6 is a diagram for explaining an exemplary display of image content according to the second embodiment. As illustrated in FIG. 6, the display control device 1 modifies the display size and position of the image content 30 to display on the display unit 12 according to the position of a real object 5 existing near the display unit 12.

The position of the real object 5 existing near the display unit 12 may be detected on the basis of a captured image captured by an imaging unit 19 installed to capture the vicinity of the display unit 12, or detected on the basis of detection results from built-in detecting sensors distributed throughout the display unit 12. The detecting sensors are realized by imaging sensors, sensors that emit and sense visible/infrared light, or the like.

As above, even in the case where a real object 5 is installed near the display unit 12 provided on a wall, the display control device 1 is still able to automatically display image content 30 or a pseudo object while avoiding an area that overlaps with the real object 5.

Note that a user may also perform an operation to modify the display size and position of image content 30 or a pseudo object so as to not overlap with a real object 5. The input of the modification operation may be transmitted to the display control device 1 from a remote control, or in the case where the display unit 12 is a touch panel display integrated with an operation input unit 14, the user may perform a modification operation by directly touching the touch panel on the wall.

[2-3. Third Embodiment]

Although the above first and second embodiments illustrate the case of displaying image content 30 on a display unit 12, in a control system according to an embodiment of the present disclosure, pseudo objects of furniture or facilities are also displayable besides image content 30. Hereinafter, such a case will be specifically described with reference to FIGS. 7 and 8.

Figure 7:
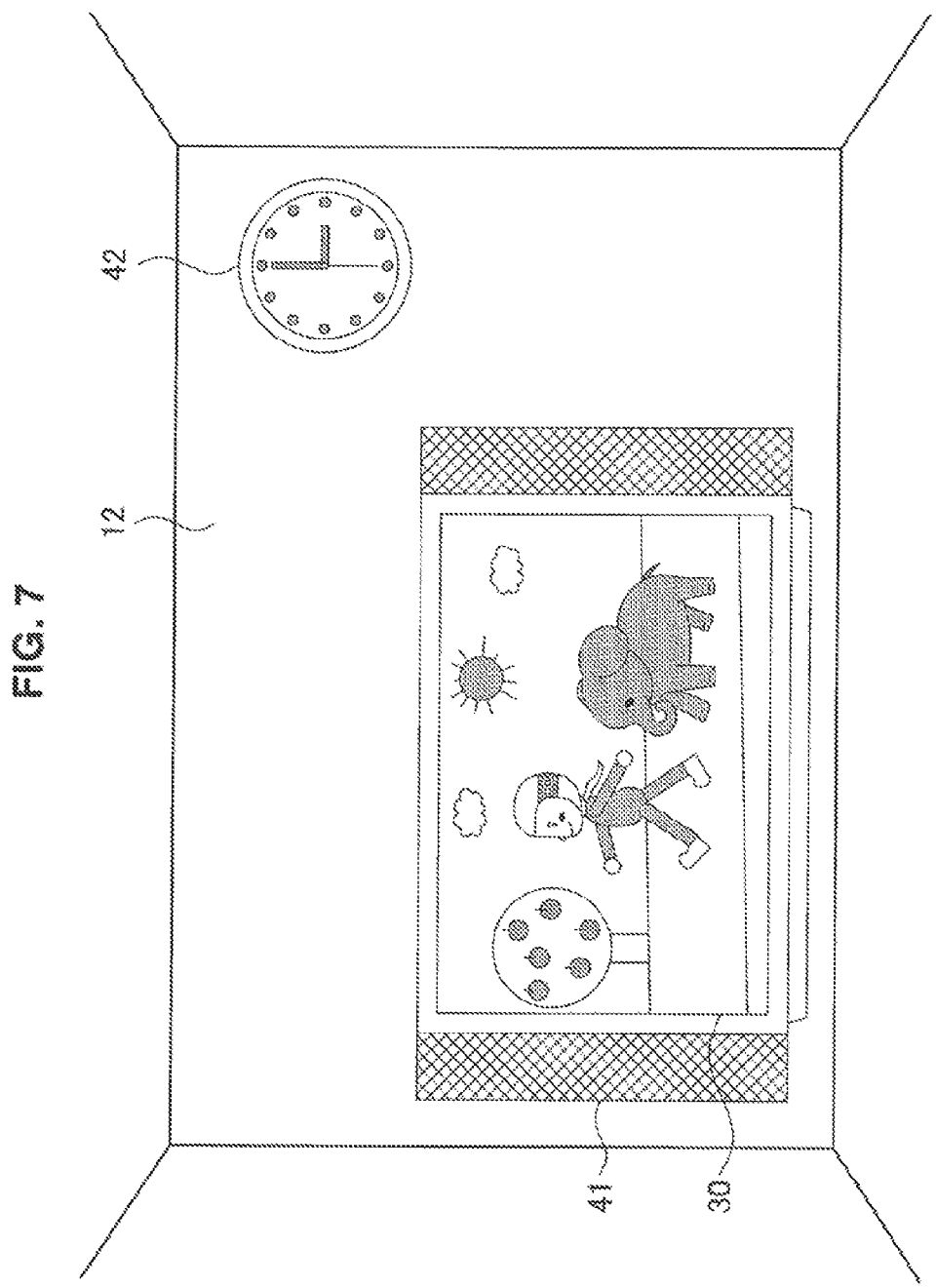
FIG. 7 is a diagram for explaining an exemplary display of multiple types of pseudo objects according to the third embodiment of the present disclosure.

FIG. 7 is a diagram for explaining an exemplary display of multiple types of pseudo objects according to the third embodiment. As illustrated in FIG. 7, the display control device 1 is able to display a television 41 and a wall clock 42 on the display unit 12 as pseudo objects. The television 41 illustrated in FIG. 7 is an example of a display device, and a display device according to an embodiment of the present disclosure is not limited to the television 41. For example, the display device may also be a personal computer (PC) desktop.

Also, the display control device 1 may modify factors such as the type, display size, design, display position, and quantity of the television 41 and the wall clock 42 according to user instructions, or automatically modify these factors according to the time or particular content. For example, the display control device 1 may also display the wall clock 42 larger than the television 41 during a morning time period when there is a greater desire to ascertain the current time, and display the television 41 larger than the wall clock 42 during an evening to night time period when there is a greater desire to relax at home. Also, in the case where the image content to play back on the television 41 is a movie, for example, the display control device 1 may also present a larger display than in the case of playing back a TV program.

Note that the pseudo television 41 and wall clock 42 displayed on the display unit 12 demonstrate behavior similar to a real-world television and wall clock. In other words, the display control device 1 controls the display to indicate the current time with the pseudo wall clock 42. Also, as illustrated in FIG. 7, the display control device 1 controls the display to place a playback screen of user-selected image content in a display screen portion of the pseudo television 41. Thus, it becomes possible for a pseudo object displayed on the display unit 12 to demonstrate behavior (implement a function of an object) similar to the same real-world object.

Figure 8:
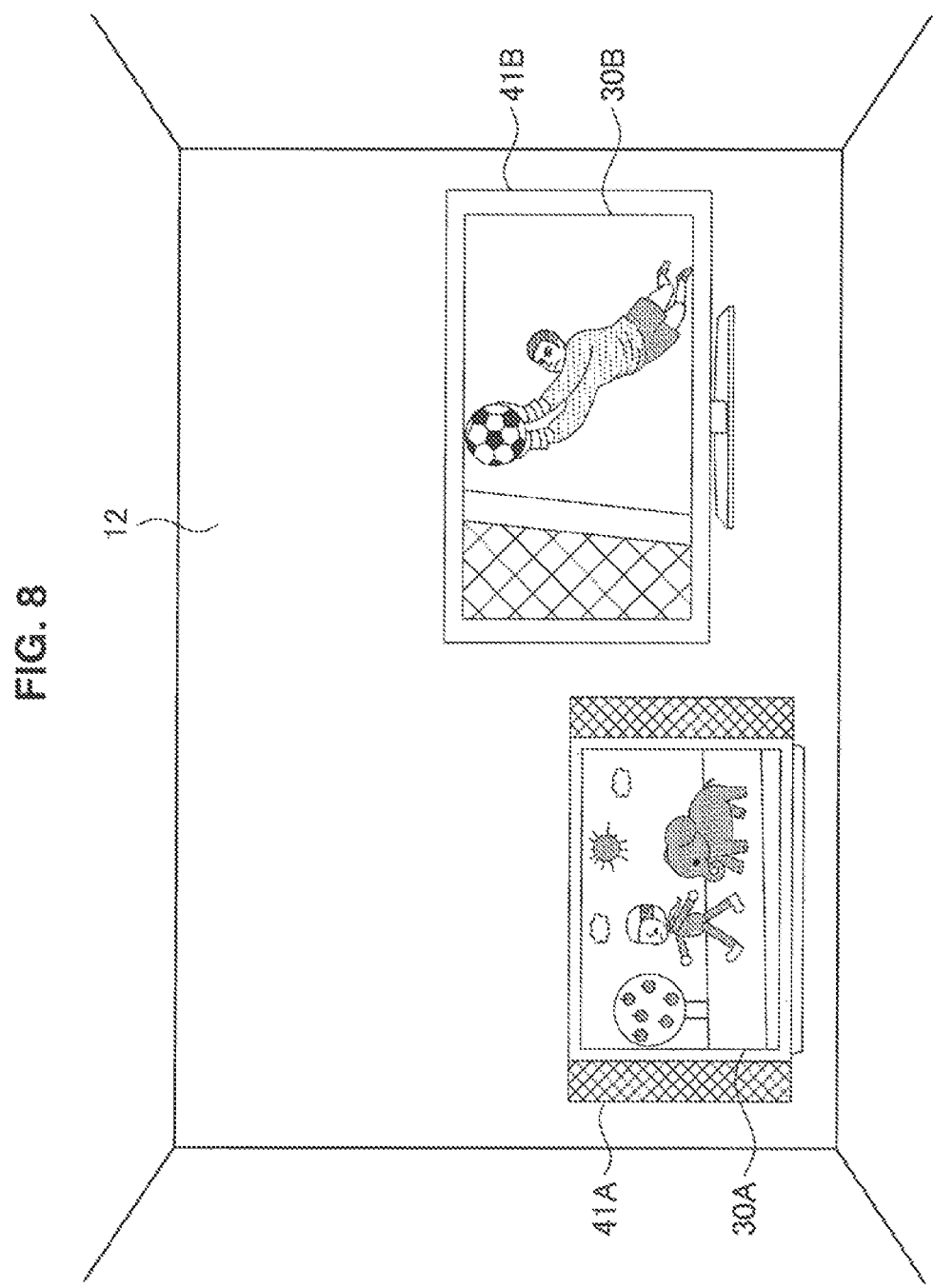
FIG. 8 is a diagram for explaining an exemplary display of the same type of pseudo object according to the third embodiment of the present disclosure.

Furthermore, although multiple, different types of pseudo objects are being displayed in the example illustrated in FIG. 7, an exemplary display of pseudo objects according to the present embodiment is not limited thereto, and multiple pseudo objects of the same type may also be displayed as illustrated in FIG. 8.

FIG. 8 is a diagram for explaining an exemplary display of the same type of pseudo object according to the third embodiment. As illustrated in FIG. 8, the display control device 1 is capable of displaying multiple pseudo televisions 41A and 41B and playing back respectively different image content 30A and 30B according to a user operation.

Thus, it is possible for a single user to view multiple instances of image content, or for multiple users to view respectively preferred image content.

Note that audio in the case of displaying a pseudo television 41 is output from an audio output unit 13 near the display unit 12 or built into the display unit 12. At this point, in the case where respectively different image content 30A and 30B is played back as illustrated in FIG. 8, the display control device 1 is also capable of modifying the parameters of the audio signal output from the audio output unit 13, and adjusting the directionality of the audio output such that the audio for the respective content reaches respective users.

[2-4. Fourth Embodiment]

Although the above first through third embodiments describe the case of primarily conducting display control as the control for implementing a function of pseudo content, the control for function implementation according to an embodiment of the present disclosure is not limited thereto. The case of primarily conducting sound control is also anticipated, for example. Hereinafter, such a case will be specifically described with reference to FIG. 9.

Figure 9:
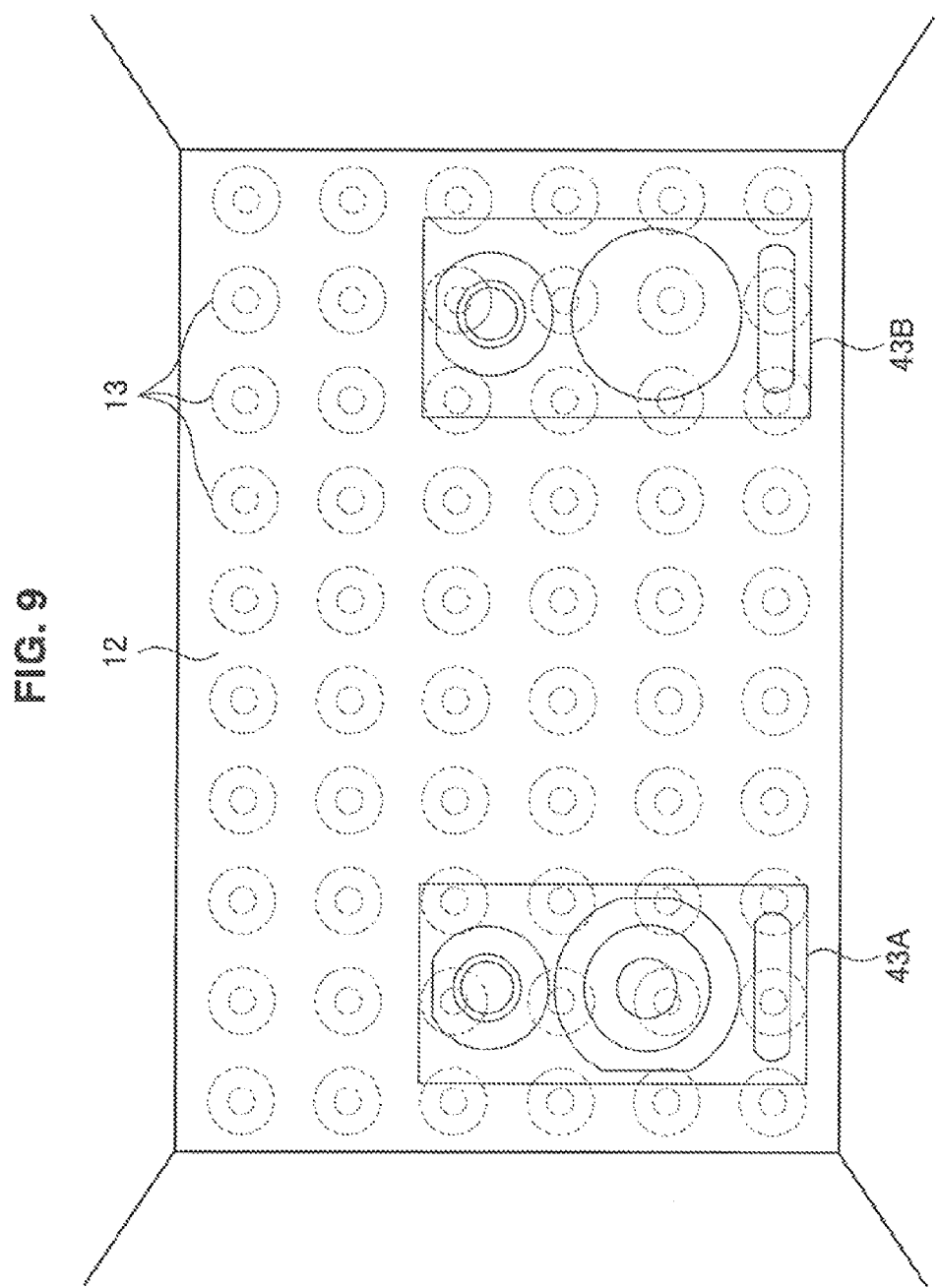
FIG. 9 is a diagram illustrating an example in which an audio output unit is placed behind a display unit according to the fourth embodiment of the present disclosure.

FIG. 9 is a diagram for explaining the case of implementing a function of pseudo speakers according to the fourth embodiment. As illustrated in FIG. 9, in the present embodiment, an array of audio output units 13 are built in behind the display unit 12. In this case, a user is able to select pseudo speakers 43A and 43B (audio output devices) to display on the display unit 12. Additionally, factors such as the design, size, position, angle, and quantity of pseudo speakers are adjustable to a user's preferences.

Subsequently, the audio output control unit 140 of the display control device 1 applies control such that user-selected sound content (an audio signal) is output from audio output units 13 built in near the display positions of the pseudo speakers 43A and 43B. Thus, a user is able to perceive as though the pseudo speakers 43A and 43B displayed on the display unit 12 are actually outputting audio.

Also, the audio output control unit 140 may also compute an audio signal to output from the audio output units 13 according to factors such as the size, position, angle, and number of pseudo speakers 43A and 43B. Specifically, the audio output control unit 140 adjusts factors such as the sound quality, source area, source position, and source direction of the audio signal to output from the audio output units 13, according to factors such as the size, position, angle, and number of the pseudo speakers 43A and 43B.

Also, in the present embodiment, by building in an array of audio output units 13 behind the entire display unit 12 as illustrated in FIG. 9, it is possible to accommodate the display of the pseudo speakers 43A and 43B anywhere on the display unit 12.

Note that the audio output control unit 140 is also capable of adjusting the directionality of audio output from built-in audio output units 13 other than those near the display positions of the pseudo speakers 43A and 43B, such that the audio is heard from near the display positions.

Furthermore, by displaying larger pseudo speakers 43 with a more luxurious design, the display control device 1 according to the present embodiment is able to provide a virtual experience as though high-quality sound were being provided, even without modifying the sound output from the audio output units 13.

[2-5. Fifth Embodiment]

Figure 10:
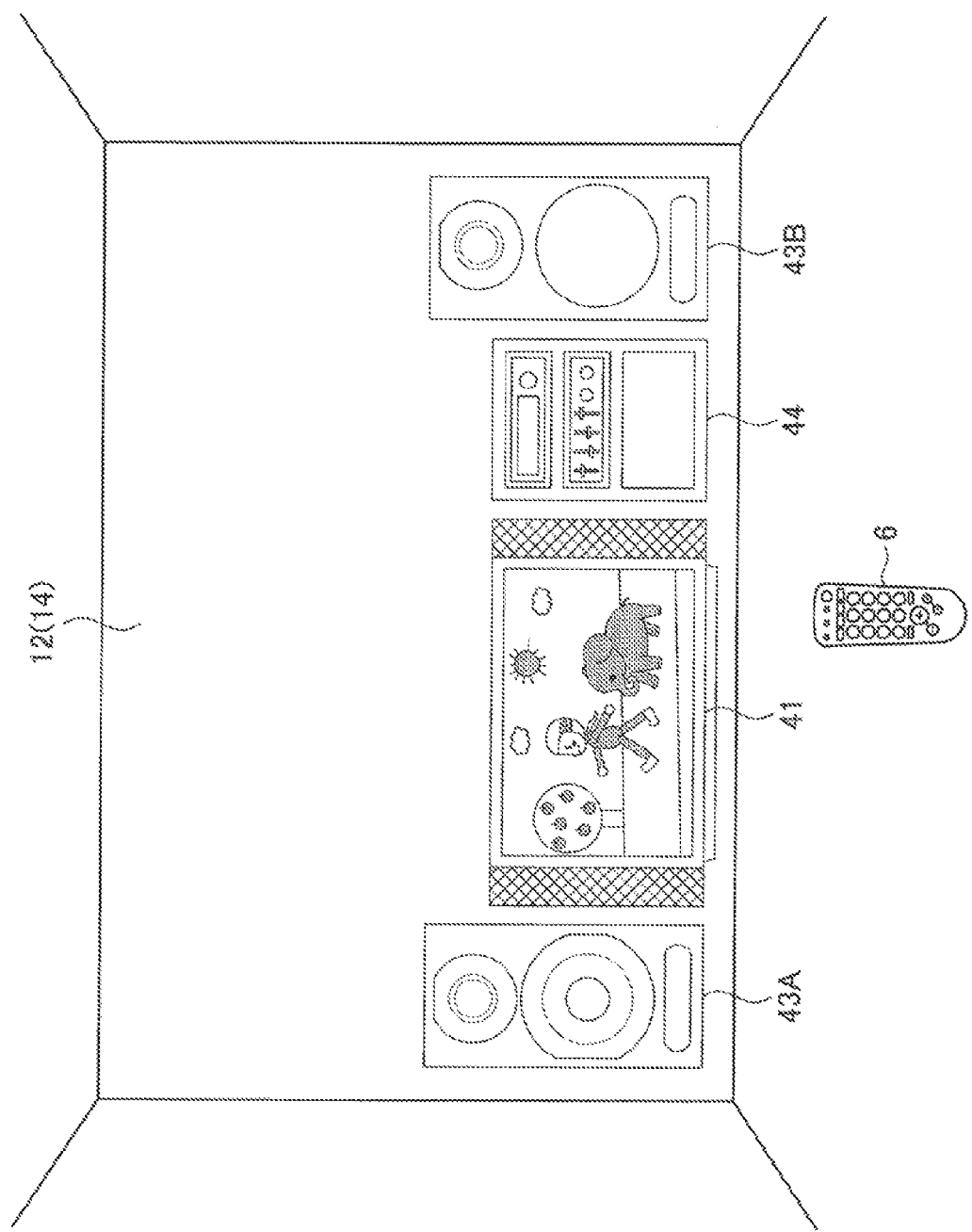
FIG. 10 is a diagram for explaining function implementation in a pseudo operating device according to the fifth embodiment of the present disclosure.

Subsequently, the case where the pseudo object is an operating device will be described with reference to FIG. 10. FIG. 10 is a diagram for explaining function implementation in a pseudo operating device according to the fifth embodiment.

As illustrated in FIG. 10, a television 41, speakers 43A and 43B, and an operating device 44 for an audio/visual (AV) device are displayed as pseudo objects on the display unit 12. The operating device 44 may be a high-end audio system, compact stereo system, radio cassette recorder or the like having features such as an amp and equalizer.

A user, by operating the pseudo operating device 44, is able to arbitrarily control sound played back from the pseudo speakers 43A and 43B. Herein, the sound played back from the pseudo speakers 43A and 43B may also be output by an array of audio output units 13 built in behind the display unit 12, similarly to the fourth embodiment.

Operation of the operating device 44 is conducted with a real-object remote control 6 illustrated in FIG. 10, for example. The operation input unit 14 of the display control device 1 accepts a signal emitted wirelessly from the remote control 6, such as by infrared or radio waves, as operation input from the user, which is output to the controller 10. The display control unit 130 of the controller 10 modifies the volume display, song title display or the like of the operating device 44 according to user operations accepted by the operation input unit 14.

Also, the audio output control unit 140 of the controller 10 modifies parameters corresponding to the audio output unit 13, such as the song selection or volume adjustment of sound to output from the audio output unit 13, according to user operations. Thus, a user is able to perceive as though the pseudo operating device 44 displayed on the display unit 12 is actually controlling the sound to output from the speakers 43A and 43B according the user's operations.

Note that the remote control 6 may also be realized by a communication device (such as a mobile phone, smartphone, or tablet device) in the user's possession.

Also, in the case where the operation input unit 14 is realized with a positional input device such as a touch panel integrated with the display unit 12, operation of the operating device 44 may also be conducted by touching an operating element image on the operating device 44 displayed on the display unit 12 (operation input unit 14), as illustrated in FIG. 10. An operating element image may include a play button, a stop button, a fast-forward button, a rewind button, a volume dial, and the like, for example. The operation input unit 14 of the display control device 1 accepts operations touching respective buttons on the display screen or tracing operations so as to rotate a volume dial as operation input from the user, which is output to the controller 10.

Furthermore, the operation input unit 14 may also analyze a user's gesture action captured by the imaging unit 19, and recognize and accept a gesture as a user operation.

The above thus describes operations with respect to the operating device 44 for an AV device, but the present embodiment is not limited to operations with respect to operating device 44, and operations with respect to the operating elements of other pseudo objects are also similarly possible. For example, in the case where the pseudo television 41 includes a power on/off switch image, a user is able to touch the switch image to perform a power on/off operation (display/hide the content playback screen placed in the television 41).

(Cabling Operations)

Also, operations with respect to pseudo objects according to the present embodiment are not limited to operations with respect to the operating element of pseudo objects, and cabling operations among multiple pseudo objects are also possible. Hereinafter, such a case will be specifically described with reference to FIG. 11.

Figure 11:
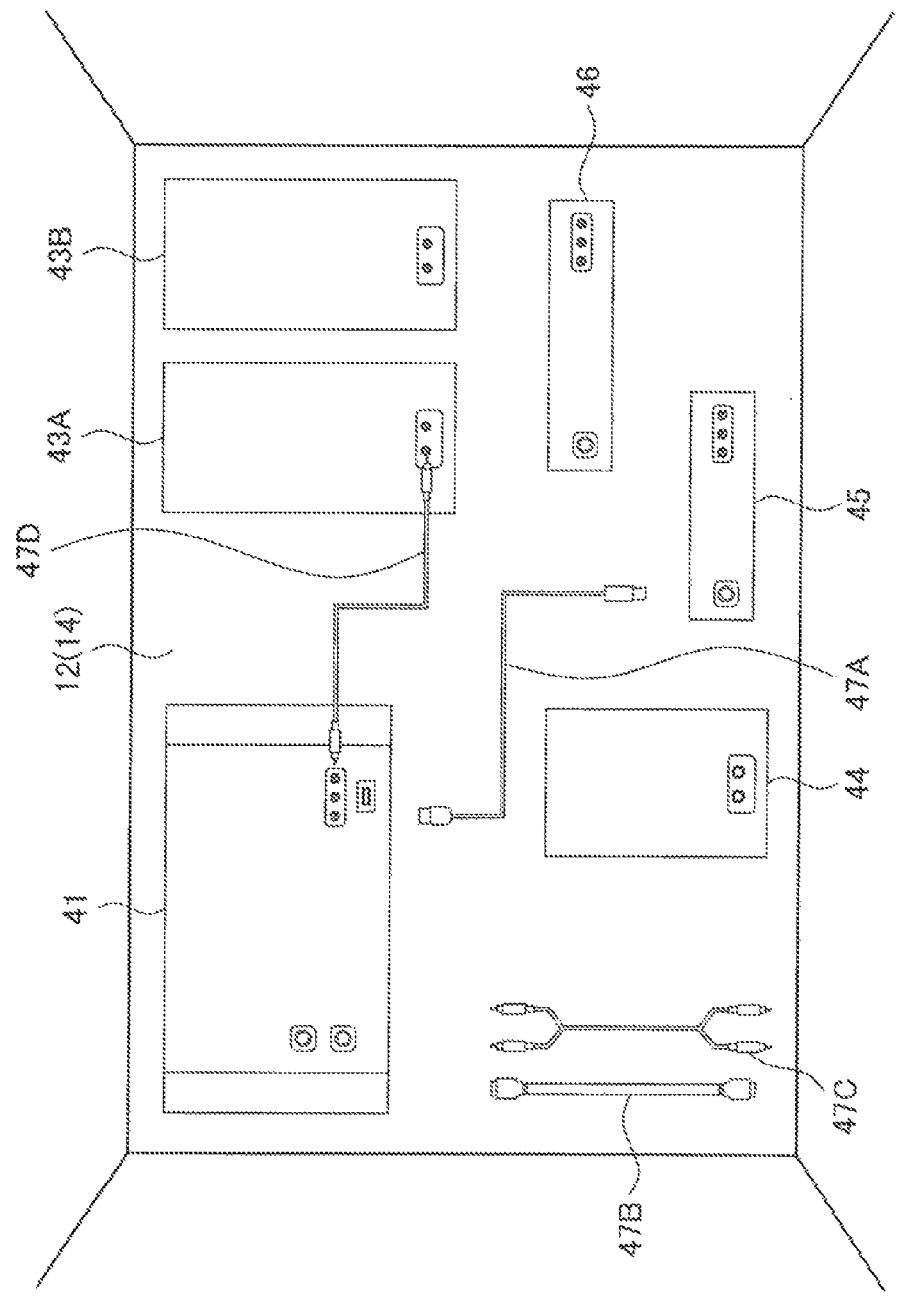
FIG. 11 is a diagram for explaining cabling operations among pseudo devices according to the fifth embodiment of the present disclosure.

FIG. 11 is a diagram for explaining cabling operations among pseudo devices according to the fifth embodiment. As illustrated in FIG. 11, a television 41, speakers 43A and 43B, an operating device 44, a recorder (recording device) 45, a player (playback device) 46, and cables 47A, 47B, 47C, and 47D are displayed as pseudo objects on the display unit 12. Note that in the present embodiment, as illustrated in FIG. 11, the back sides of the television 41, the speakers 43A and 43B, the operating device 44, and the like are displayed, and operations are conducted with respect to input terminals ordinarily provided on the back side.

The pseudo cables 47A to 47D are utilized in order to make I/O connections among multiple pseudo objects. For example, as illustrated in FIG. 11, the cable 47D connects the television 41 and the speaker 43A. Also, the display unit 12 according to the present embodiment is a touch panel display integrated with the operation input unit 14, and a user is able to conduct arbitrary cabling operations by touching and dragging the cables 47 to designated input terminals.

According to such cabling with pseudo cables 47, the controller 10 controls signal input/output among multiple pseudo objects. For example, as illustrated in FIG. 11, in the case where the television 41 and the recorder 45 are connected by the cable 47A, the controller 10 stores content to playback on the display screen of the television 41 in the storage unit 16 in association with the recorder 45, according to a user operation. The controller 10 may then present such stored content as a list of content being stored in the recorder 45, and play back such stored content on the display screen of the television 41 according to a user operation.

In this way, a user is able to arbitrarily modify the cabling among multiple pseudo objects with pseudo cables 47, and by having signal input/output be controlled according to the cabling, each pseudo object is able to exhibit more functions similar to the same real-world object.

[2-6. Sixth Embodiment]

Next, the case where a pseudo object according to an embodiment of the present disclosure is a mirror will be specifically described with reference to FIG. 12.

Figure 12:
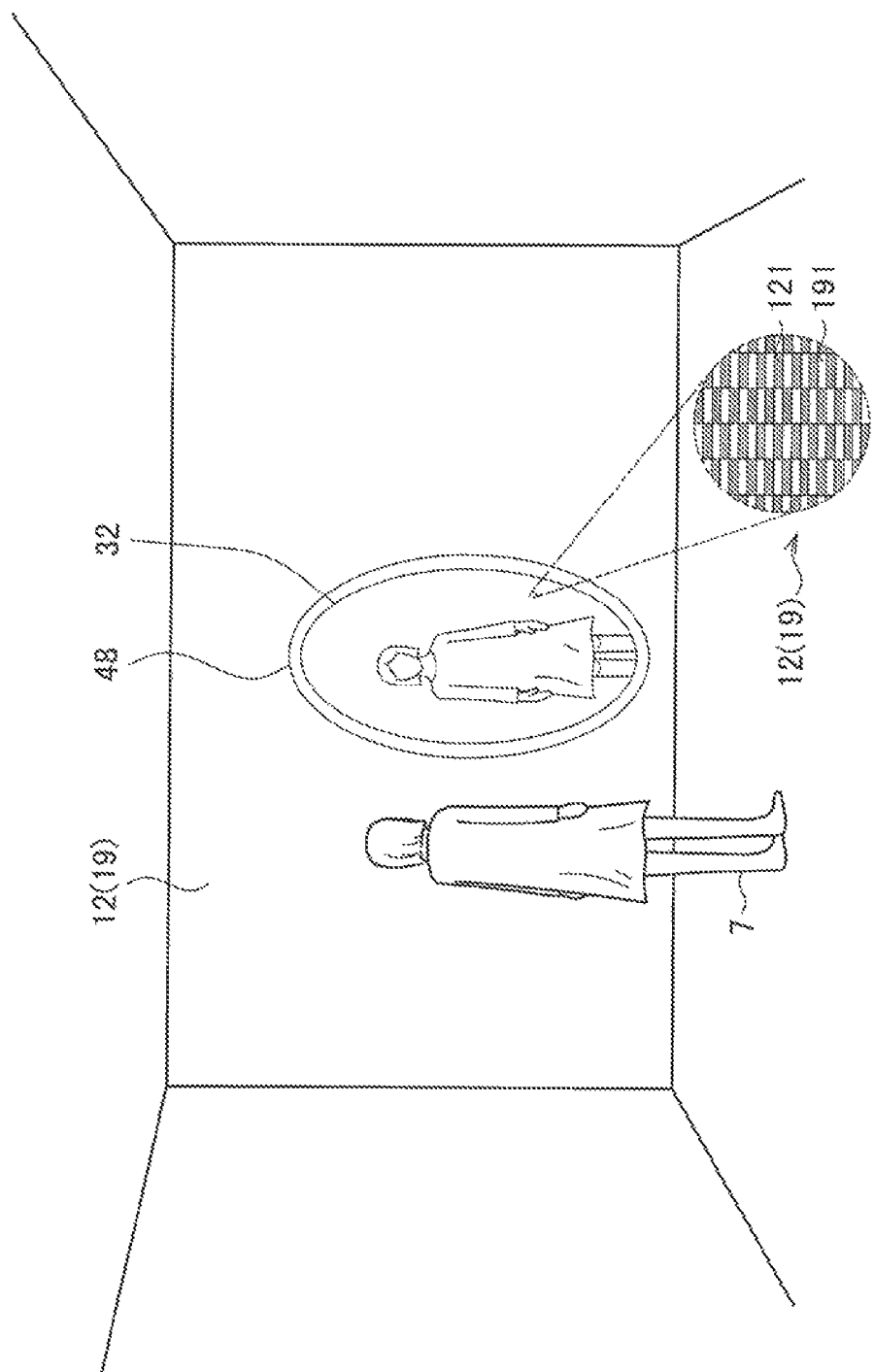
FIG. 12 is a diagram for explaining the case where the pseudo object is a mirror in the sixth embodiment of the present disclosure.

FIG. 12 is a diagram for explaining the case where the pseudo object is a mirror in the sixth embodiment. As illustrated in FIG. 12, a mirror 48 is displayed as a pseudo object on the display unit 12.

The display control device 1 captures a user 7 facing the pseudo mirror 48 with the imaging unit 19. Then, the display control unit 130 of the controller 10 applies control to display a captured image captured by the imaging unit 19 in a placement area 32 of the mirror 48 as a mirror image in real-time. Thus, the user 7 is able to see his or her own reflection in the pseudo mirror 48.

Note that if there is a discrepancy between the position of the mirror displayed in the placement area 32 and the position of the imaging unit 19, parallax between the user 7 and the mirror may occur. Accordingly, in the present embodiment, the imaging unit 19 is embedded into the display unit 12, and a captured image captured by an imaging unit 19 built in near the display position of the mirror 48 may be displayed in the placement area 32 as a mirror image. Thus, the parallax between the user and the mirror image is greatly reduced, or at least practically eliminated.

Furthermore, in the present embodiment, by building the imaging unit 19 into the entire display unit 12 as an array, it is possible to accommodate the display of the pseudo mirror 48 anywhere on the display unit 12. More specifically, as illustrated in FIG. 12, multiple image sensors (that is, image sensors 191) and multiple display pixels 121 are arranged on separate layers or on the same substrate forming the visual communication system of the display unit 12. The image sensors 191 and the display pixels 121 may be arranged such that different types vary horizontally and vertically, as illustrated in FIG. 12, or arranged such that groups made up of multiple elements of the same type vary horizontally and vertically.

The multiple image sensors 191 may be charge-coupled device (CCD) sensors, for example, which capture light from a microlens array (not illustrated) provided on the outer surface, and cooperate to capture an image. Meanwhile, the multiple display pixels 121 may be liquid crystal display (LCD) pixels, for example, which cooperate to display a captured image in accordance with instructions from the display control unit 130.

Thus, parallax between the user 7 and the mirror in the placement area 32 of the pseudo mirror 48 may be greatly reduced, and additionally, the mirror 48 may be displayed at any position on the display unit 12 according to the user's arbitrary wishes.

In the example described above, parallax is reduced by reducing the disparity between the position of the imaging unit 19 and the display position of the mirror 48. However, a parallax reduction method according to the present embodiment is not limited thereto, and may be a method that reduces parallax by image processing, for example. The controller 10 may also process a user's viewpoint of a captured image captured by the imaging unit 19 according to the disparity between the position of the imaging unit 19 and the display position of the mirror 48, and generate a mirror image with reduced parallax.

Also, the controller 10 according to the present embodiment may generate a mirror image by compositing captured images captured by multiple imaging units 19 installed at the four corners of the wall on which the display unit 12 is provided.

The above thus specifically describes the case where a pseudo object according to an embodiment of the present disclosure is a mirror. Note that the image to be displayed in the placement area of the mirror 48 is not limited to a mirror image, and that a processed image obtained by conducting face-thinning and beautification processing on the basis of a captured image, compositing with graphics, and the like may also be displayed. Thus, it is possible to add designated processing functions to the function of a real-world mirror.

Also, factors such as the frame design, size, display position, and quantity of the pseudo mirror 48 obviously may be arbitrarily modified by user operations.

[2-7. Seventh Embodiment]

Next, the case where a pseudo object according to an embodiment of the present disclosure is storage furniture will be specifically described with reference to FIGS. 13 and 14.

Figure 13:
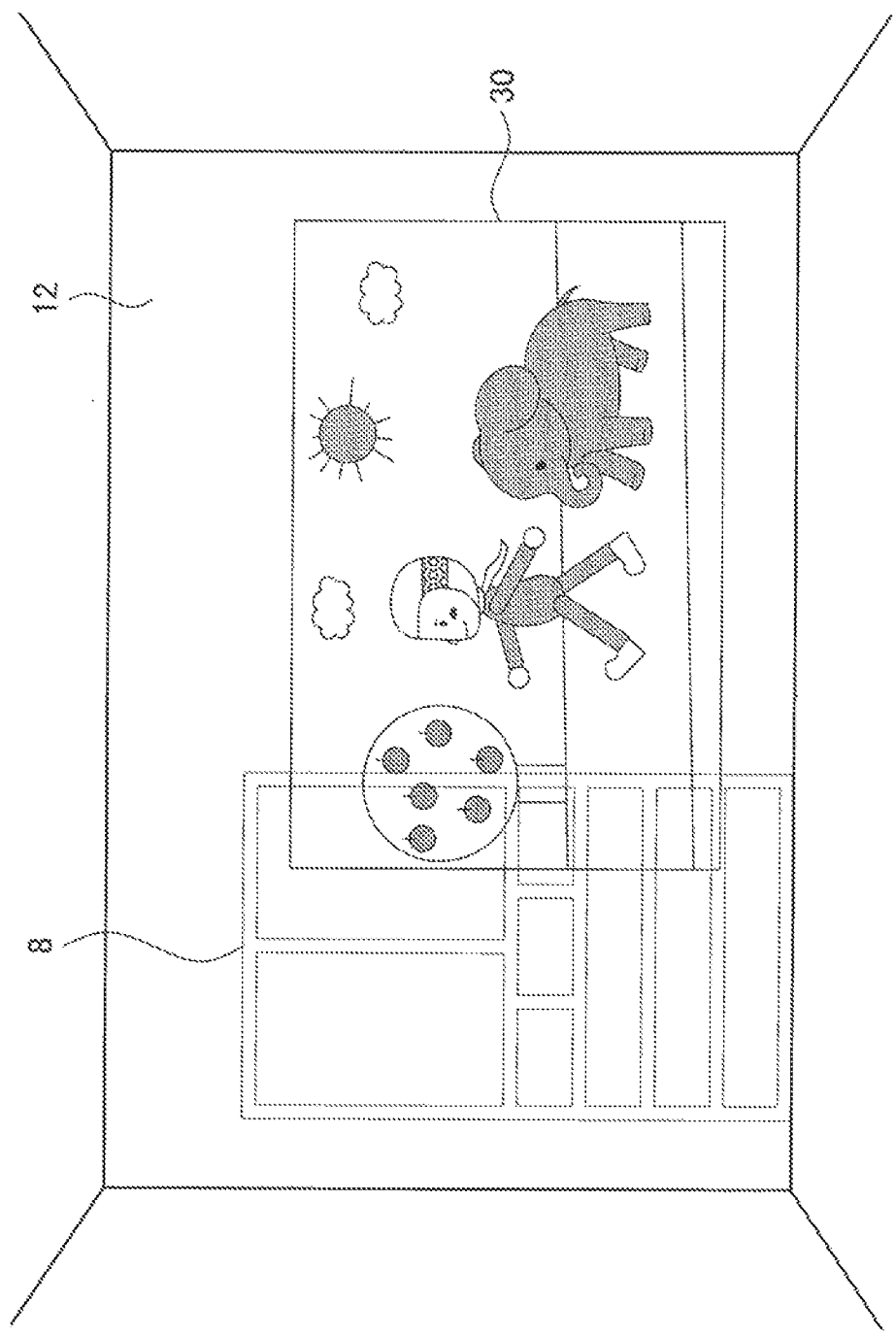
FIG. 13 is a diagram for explaining the case where the pseudo object is storage furniture in the seventh embodiment of the present disclosure.
Figure 14:
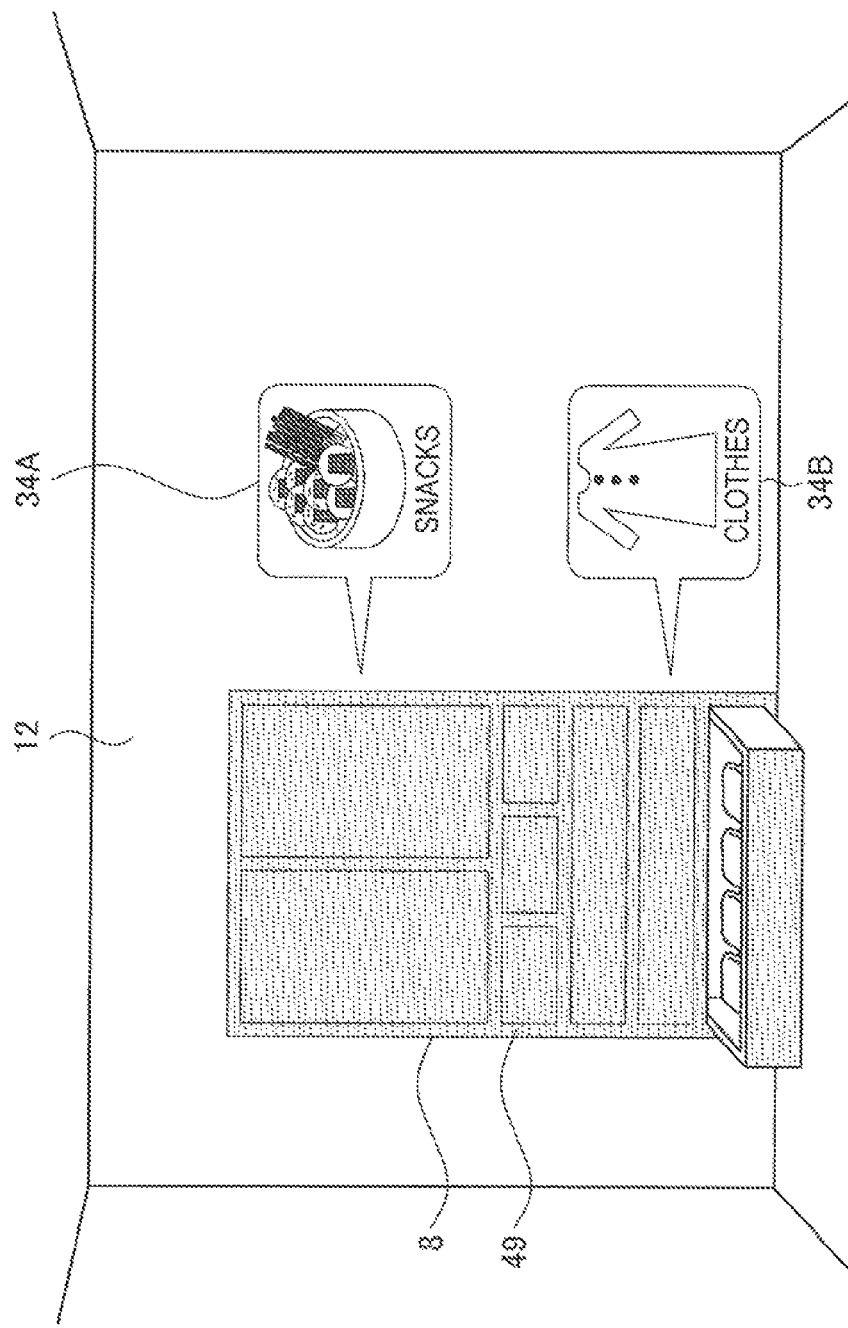
FIG. 14 is a diagram for explaining the case where the pseudo object is storage furniture in the seventh embodiment of the present disclosure.

FIGS. 13 and 14 are diagrams for explaining the case where the pseudo object is storage furniture in the seventh embodiment. As illustrated FIG. 13, in the present embodiment, storage furniture 8 having drawers, doors, or the like is embedded in part of the wall in which the display unit 12 is installed. Since the display unit 12 is provided on the surface of the drawers, doors, or the like of the storage furniture 8, in the case of not utilizing the storage furniture 8, it is possible to display image content 30 as part of the display unit 12 as illustrated in FIG. 13, and effectively utilize the wall.

On the other hand, in the case where a user selects to utilize the storage furniture 8, the display control unit 130 displays an image of pseudo storage furniture 49 aligned with the positions of the drawers and doors of the storage furniture 8, as illustrated in FIG. 14. The design of the storage furniture 49 may be arbitrarily set by the user, or automatically set according to an interior design theme. Note that the display control unit 130 displays the pseudo storage furniture 49 according to the positions of the actual drawers and doors.

Also, the opening and closing of a door or drawer may be motor-driven and controlled by the controller 10 according to a user operation, or push-type.

Also, by registering in advance an item stored behind a door or inside a drawer, a user is able to ascertain a stored item without actually opening the door or drawer, by having stored item displays 34A and 3413 be displayed in association with the position of a door or drawer, as illustrated in FIG. 14. Also, the registered contents for stored items may be input by the user, or be a captured image captured by an imaging unit 19 installed behind a door or inside a drawer.

Note that storage furniture embedded into a wall is not limited to the example illustrated in FIGS. 13 and 14, and may for example be mechanical storage furniture (a real object) having multiple storage units and a single slot. Such mechanical storage furniture is constructed to move the multiple storage units between a storage area and a slot area, and in the case of storing and retrieving items, a storage unit is move to the slot area, and after storage or retrieval, the storage unit is stored in the storage area.

The above thus uses FIGS. 13 and 14 to describe a case in which storage furniture 8, which is a real object, is embedded into a wall, and pseudo storage furniture 49 is made to implement a function of storing real-world items. However, the things to be stored in pseudo storage furniture 49 according to the present embodiment are not limited to real-world items. For example, the pseudo storage furniture 49 may include a function of storing electronic data such as ebooks similarly to real-world items. Hereinafter, such a case will be specifically described with reference to FIG. 15.

Figure 15:
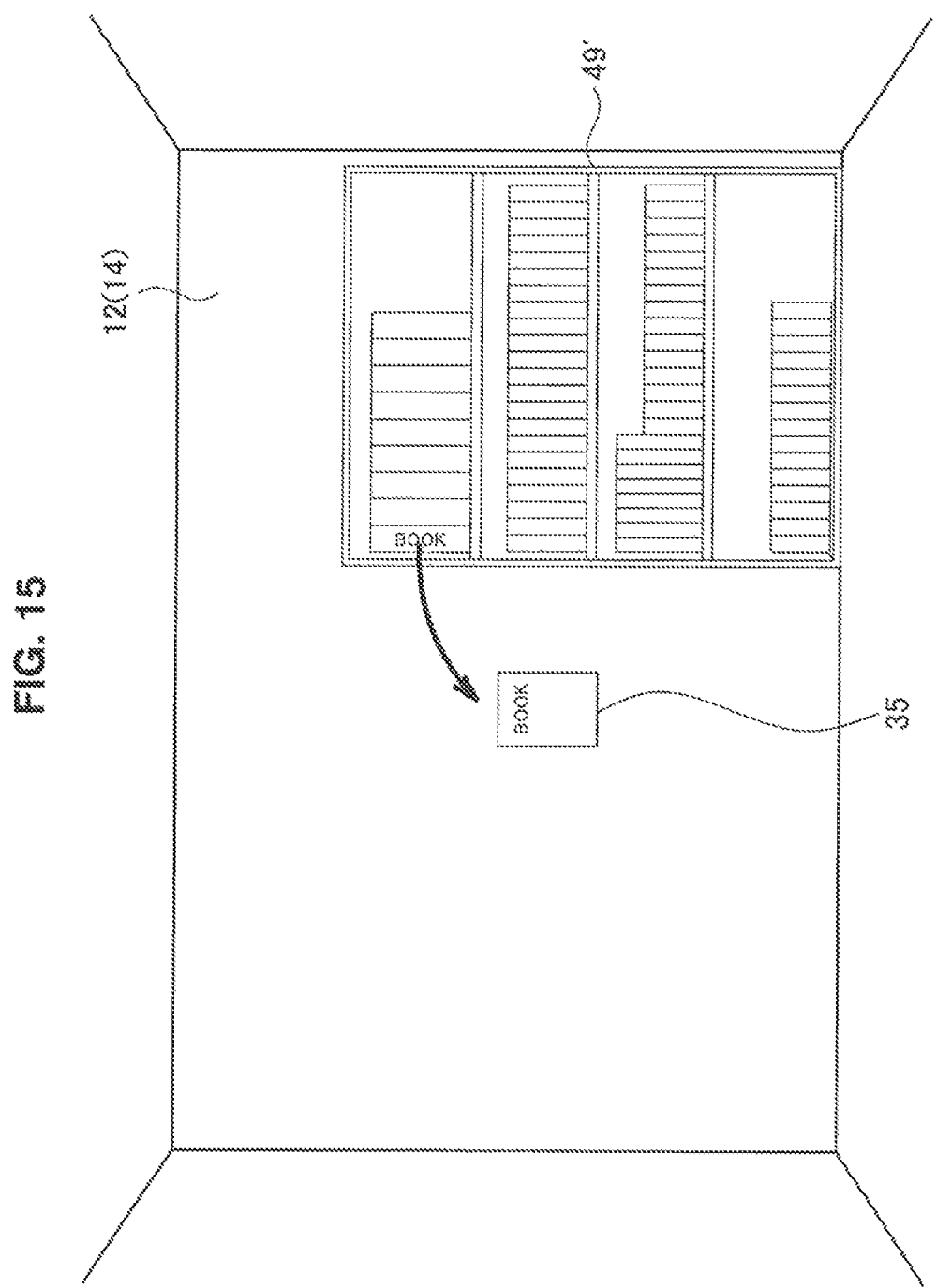
FIG. 15 is a diagram for explaining the case of storing an ebook in the seventh embodiment of the present disclosure.

FIG. 15 is a diagram for explaining the case of storing an ebook in the seventh embodiment. As illustrated in FIG. 15, the display control unit 130 displays pseudo storage furniture 49' on the display unit 12, and displays an arrangement of ebook spines or covers on a shelf portion of the storage furniture 49'.

In this way, it is possible to store ebooks (electronic data) in the storage furniture 49', similarly to a real-world bookshelf.

Note that in the case where the display unit 12 is realized by a touch panel display integrated with the operation input unit 14, the user makes a selection by touching an ebook he or she wants to view from among the ebooks being displayed on the display unit 12. The controller 10, in response to the user's touch operating, displays the selected ebook outside of the storage furniture 49' as illustrated in FIG. 15, for example, and presents the ebook contents according to user operations such as page-turning.

[2-8. Eighth Embodiment]

Figure 16:
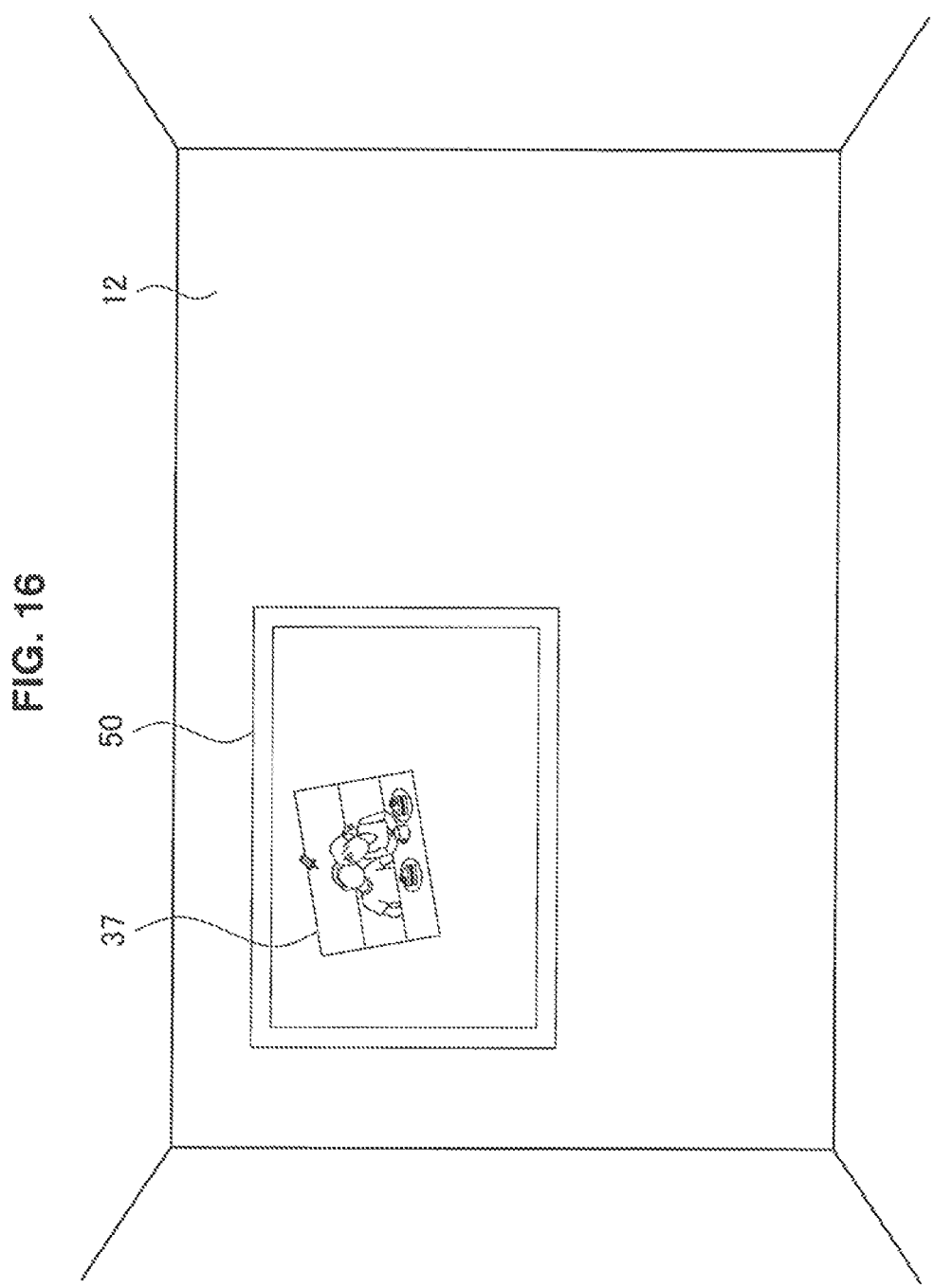
FIG. 16 is a diagram for explaining the case where the pseudo object is a bulletin board in the eighth embodiment of the present disclosure.

Next, the case where a pseudo object according to an embodiment of the present disclosure is a bulletin board will be specifically described with reference to FIG. 16. FIG. 16 is a diagram for explaining the ease where the pseudo object is a bulletin board in the eighth embodiment.

As illustrated in FIG. 16, the display control unit 130 according to the present embodiment displays a pseudo bulletin board 50 on the display unit 12 provided on a wall. Also, the display control unit 130 displays user-selected image content 37 in a placement area of the bulletin board 50. In this case, the display control unit 130 realizes an expression as if a photo is posted on a bulletin board as a real-world object.

Specifically, as illustrated in FIG. 16, for example, in the placement area of the bulletin board 50, the image content 37 may be processed as though held in place with a thumb tack, and displayed tilted at a designated angle with respect to the horizontal direction.

Also, besides being a photographic image, a note, a drawing, a calendar (which may include a schedule display), or the like, the image content 37 may also be video (a moving image).

Also, the display control device 1 may also acquire update information such as notes or a schedule from the server 3 via the network 4, and display the most recent information on the pseudo bulletin board 50.

Note that factors such as the design, size, display position, and quantity of the bulletin board 50 obviously may be arbitrarily modified according to user operations.

Also, the display control unit 130 according to the present embodiment may make it appear as though image content 37 such as a photo or note is posted onto the wall directly, without displaying the bulletin board 50.

Also, besides the bulletin board 50, the display control unit 130 according to the present embodiment may display a pseudo picture frame, and display user-selected image content 37 in a placement area of the pseudo picture frame.

[2-9. Ninth Embodiment]

Figure 17:
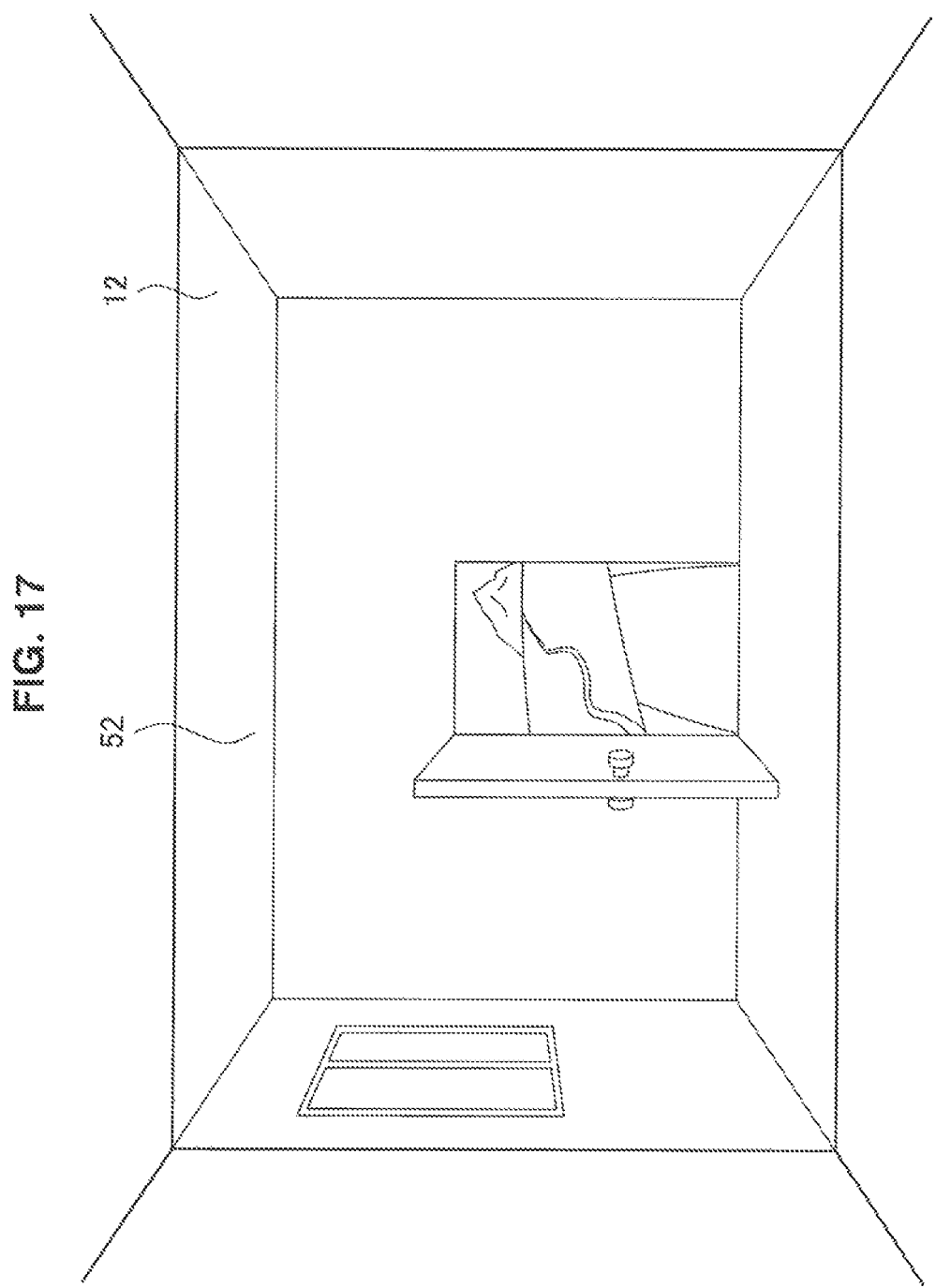
FIG. 17 is a diagram for explaining the case where the pseudo object is the interior of a room in the ninth embodiment of the present disclosure.

Next, the case where a pseudo object according to an embodiment of the present disclosure is the interior of a room will be specifically described with reference to FIG. 17. FIG. 17 is a diagram for explaining the case where the pseudo object is the interior of a room in the ninth embodiment.

As illustrated in FIG. 17, the display control unit 130 according to the present embodiment displays a pseudo room interior 52 on the display unit 12 provided on a wall. Additionally, the room interior 52 is an image with perspective processing applied as illustrated in FIG. 17. By displaying such a room interior 52 on the wall, it is possible to present a visual illusion of a wider room.

Also, the type of room interior 52 may be modified according to a user operation, and may also be automatically set according to an interior design theme.

Also, the controller 10 according to the present embodiment may generate an image with perspective processing applied by the video processor 17, on the basis of a captured image capturing the room interior by an imaging unit 19 provided in the room. Thus, the display control device 1 according to the present embodiment becomes capable of displaying a pseudo room interior 52 that appears to be actually continuous with the walls and floor of the real-world room.

[2-10. Tenth Embodiment]

Figure 18:
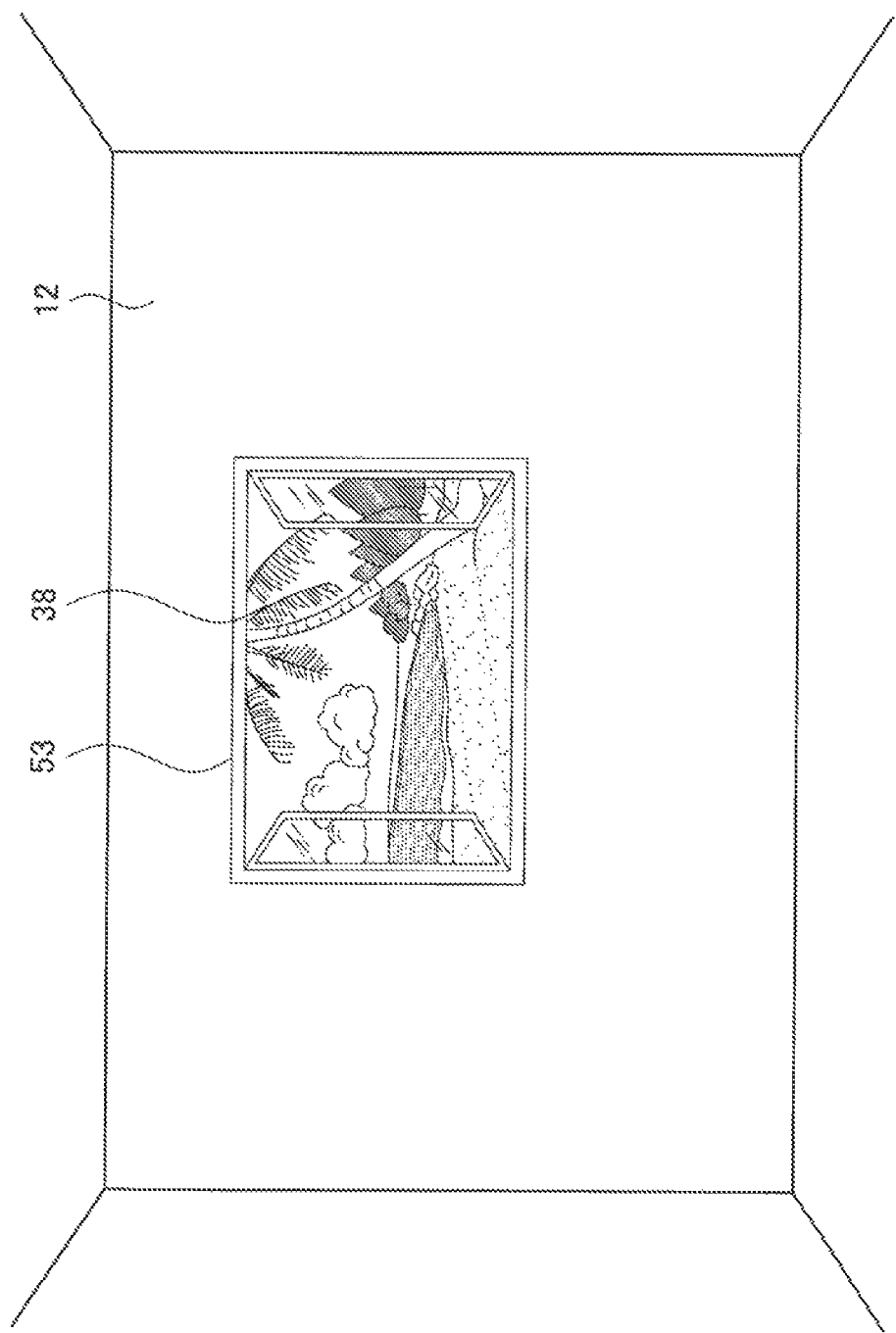
FIG. 18 is a diagram for explaining the case where the pseudo object is a window in the tenth embodiment of the present disclosure.

Next, the case where a pseudo object according to an embodiment of the present disclosure is a window will be specifically described with reference to FIG. 18. FIG. 18 is a diagram for explaining the case where the pseudo object is a window in the tenth embodiment.

As illustrated in FIG. 18, the display control unit 130 according to the present embodiment displays a pseudo window 53 on the display unit 12 provided on a wall. Factors such as the design, size, display position, and quantity of the window 53 obviously may be arbitrarily modified by user operations.

Also, the display control unit 130 displays scenery content 38 in a placement area of the window 53. The type of scenery content 38 may be modified to the scenery of an arbitrary place by a user operation. Also, the display control unit 130 may display scenery according to the current time.

Furthermore, in the case of constructing a system able to acquire captured images (scenery content) captured by multiple cameras installed outdoors in real-time via the network 4, the display control unit 130 is able to display the scenery of a user-specified place in real-time.

Also, the display control device 1 may display scenery content 38 while also outputting audio associated with the scenery content 38 from the audio output unit 13. For example, by playing back ocean sounds in the case of displaying ocean scenery in the pseudo window 53, the display control device 1 according to the present embodiment is able to provide a user with a virtual experience as though actually looking out at the ocean from a window.

Note that in the case where the window 53 is defined as the entire wall, the display control unit 130 according to the present embodiment may apply control to display scenery content 38 on the entire wall, without displaying a window frame.

(Skylight)

Figure 19:
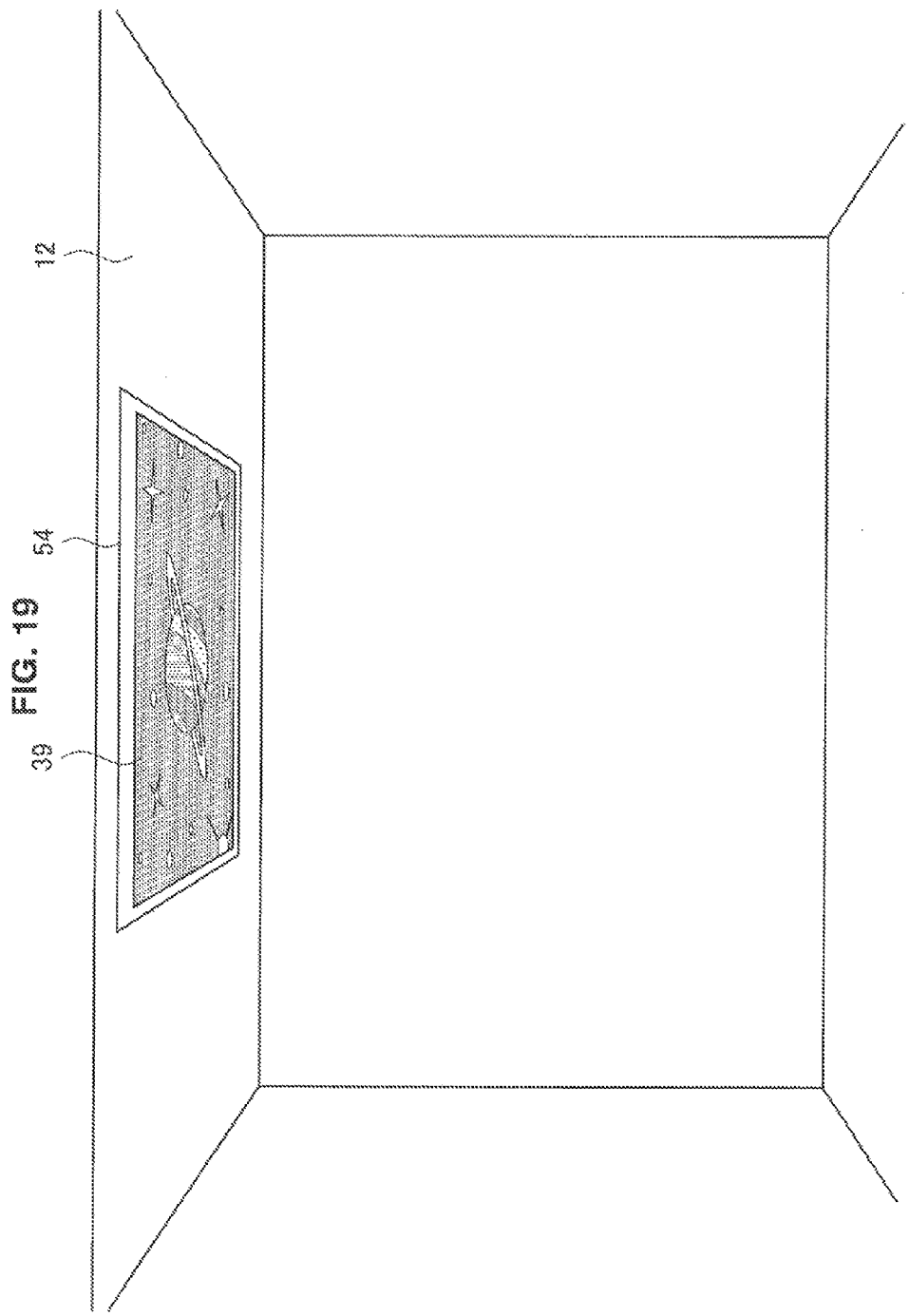
FIG. 19 is a diagram for explaining the case where the pseudo object is a skylight in the tenth embodiment of the present disclosure.

Although the above uses FIG. 18 to describe the case of displaying a pseudo window 53 on a wall, a pseudo window 53 according to the present embodiment is not limited to the example illustrated in FIG. 18, and may also be a skylight, for example. Hereinafter, such a case will be specifically described with reference to FIG. 19. FIG. 19 is a diagram for explaining the case where the pseudo object is a skylight in the tenth embodiment.

In the present embodiment, the display unit 12 is installed on a ceiling. Additionally, the display control unit 130 according to the present embodiment displays a pseudo skylight 54 on the display unit 12 on the ceiling, as illustrated in FIG. 19. Factors such as the design, size, display position, and quantity of the skylight 54 obviously may be arbitrarily modified by user operations.

Also, the display control unit 130 displays scenery content 39 in a placement area of the skylight 54. The scenery content 39 displayed on the skylight 54 is an image of the sky or outer space. Also, the type of the image of the sky or outer space displayed in the skylight 54 may be changed to an arbitrary image by a user operation. Also, similarly to the above, the display control unit 130 may also display an image of the sky or outer space according to the current time.

Furthermore, and similarly to the above, in the case of constructing a system able to acquire captured images of the sky captured by multiple cameras installed outdoors in real-time via the network 4, the display control unit 130 is able to display sky scenery of a user-specified place in real-time.

Also, the display control device 1 may display scenery content 39 while also outputting audio associated with the scenery content 39 from the audio output unit 13.

[2-11 Eleventh Embodiment]

Figure 20:
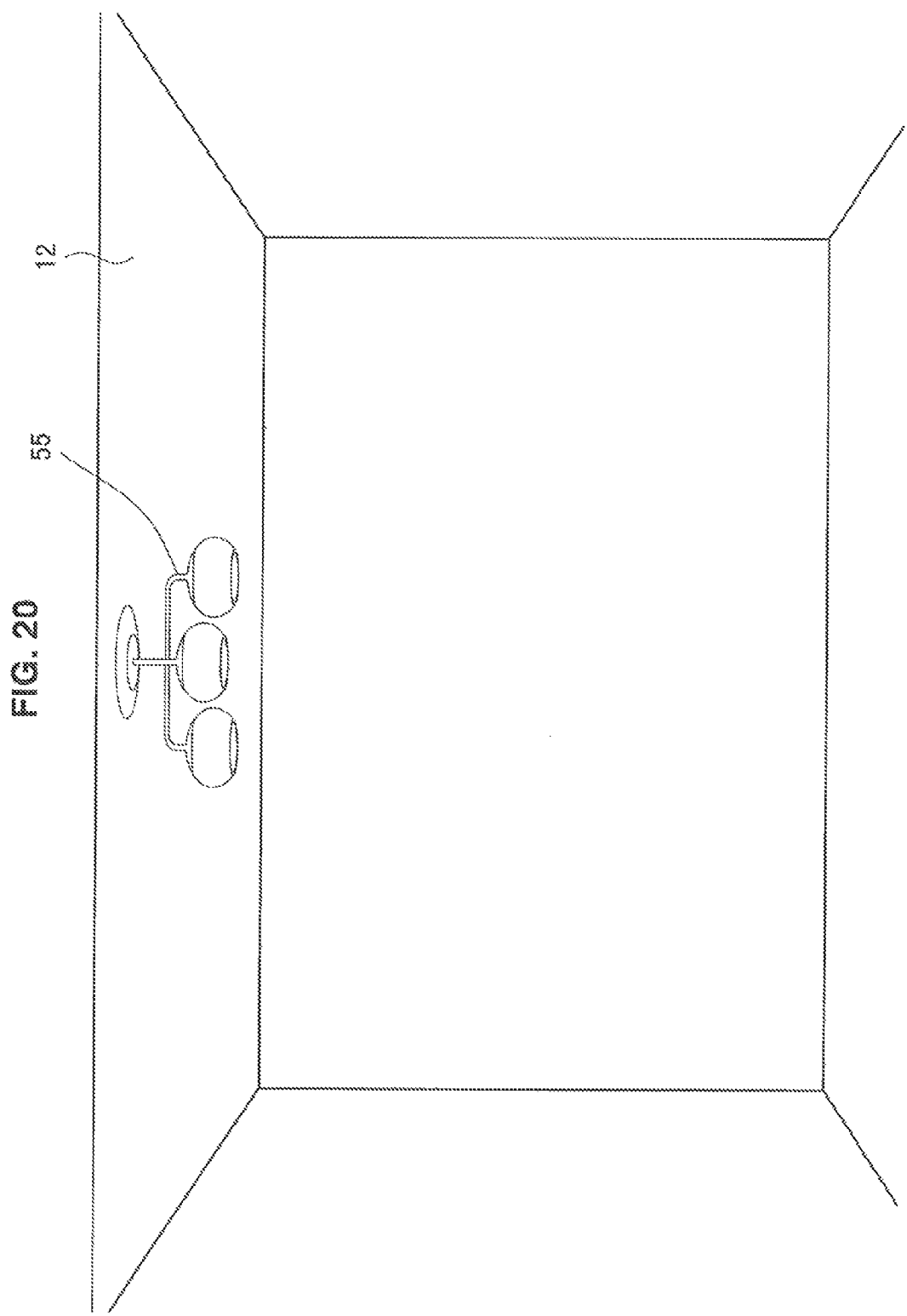
FIG. 20 is a diagram for explaining the case where the pseudo object is a lighting device in the eleventh embodiment of the present disclosure.

Next, the case where a pseudo object according to an embodiment of the present disclosure is a lighting device will be specifically described with reference to FIG. 20. FIG. 20 is a diagram for explaining the case where the pseudo object is a lighting device in the eleventh embodiment.

As illustrated in FIG. 20, the display control unit 130 according to the present embodiment displays a pseudo lighting device 55 on the display unit 12 provided on a ceiling. Factors such as the design, size, display position, quantity, illumination level, and lighting color of the lighting device 55 obviously may be arbitrarily modified by user operations.

In this way, by taking the entire ceiling to be a display unit 12 and displaying a pseudo lighting device 55, it becomes possible to provide emitted light from the display unit 12 as lighting from the pseudo lighting device 55.

Note that although a pseudo lighting device 55 is being displayed on a display unit 12 provided on the ceiling in the example illustrated in FIG. 20, the type of lighting device 55 is not limited to lighting provided on the ceiling, and may also be a freestanding lighting device. Specifically, the display control device 1 may display a freestanding lighting device (not illustrated) on a display unit provided on a wall.

[2-12. Twelfth Embodiment]

Figure 21:
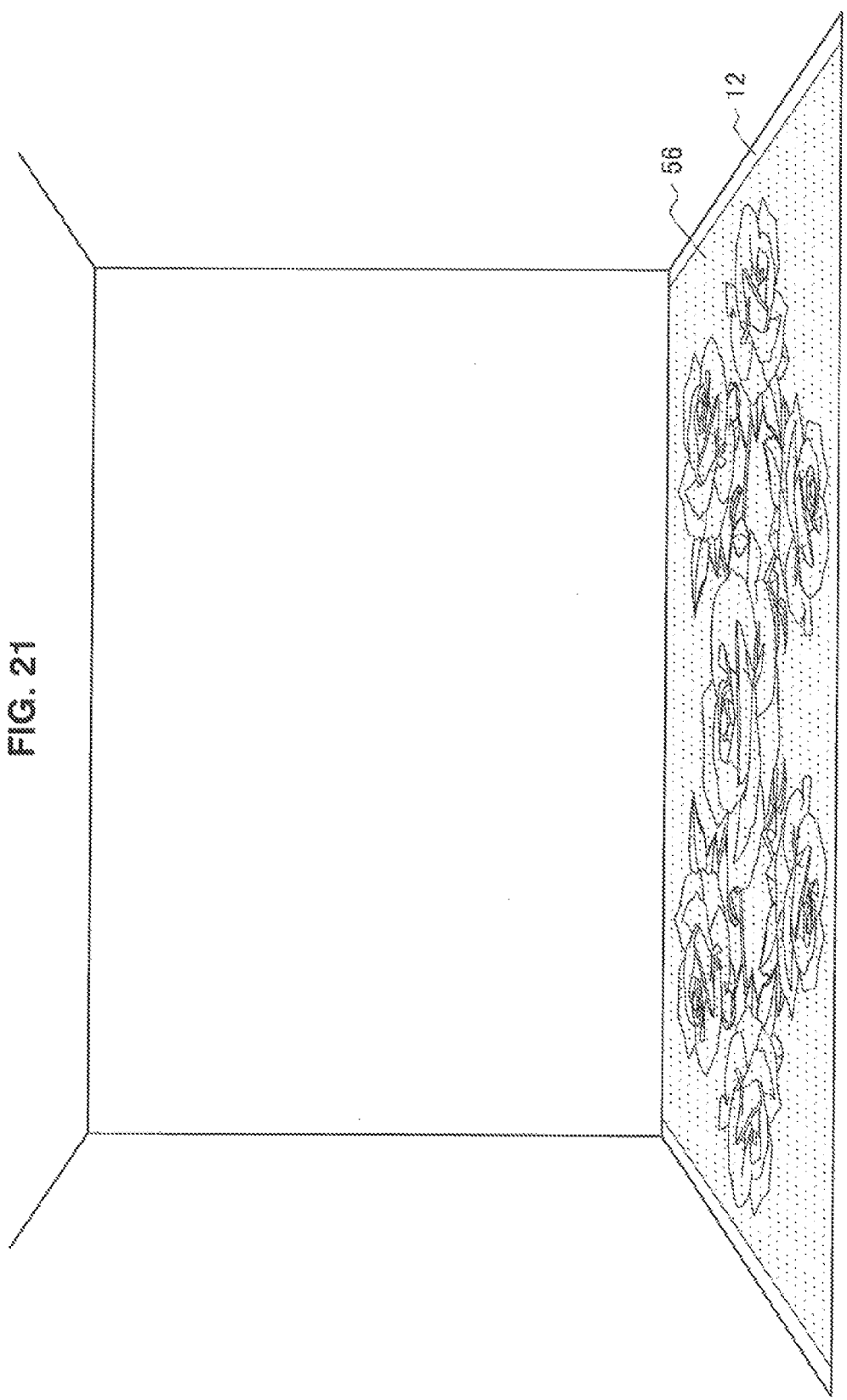
FIG. 21 is a diagram for explaining the case where the pseudo object is carpet in the twelfth embodiment of the present disclosure.

Next, the case where a pseudo object according to an embodiment of the present disclosure is a carpet will be specifically described with reference to FIG. 21. FIG. 21 is a diagram for explaining the case where the pseudo object is a carpet in the twelfth embodiment.

As illustrated in FIG. 21, the display control unit 130 according to the present embodiment displays a pseudo carpet 56 on a display unit 12 provided on the floor. Factors such as the design, size, and display position of the carpet 56 obviously may be arbitrarily modified by user operations. The design of the carpet 56 may also be automatically set according to factors such as the room temperature and the season.

In this way, by taking the entire floor to be a display unit 12 and displaying a pseudo carpet 56, it becomes possible to exhibit interior design effects and alter the mood of the room.

Note that although a pseudo carpet 56 is being displayed in the example illustrated in FIG. 21, the pseudo object to be displayed on the display unit 12 provided on the floor is not limited to a carpet, and may also be pseudo flooring, tatami mats, concrete, grass, soil, or the like, for example.

<3. Conclusion>

As discussed above, in a control system according to the present embodiment, a pseudo object may be utilized similarly to a real-world object. In other words, in a control system according to the present embodiment, an image of a pseudo object is displayed on a display unit 12 provided on a wall or ceiling, and respective devices such as the display unit 12 and an audio output unit 13 are controlled so as to implement a function similar to the same object in the real world.

Also, since factors such as the design, size, display position, and quantity of a pseudo object may be arbitrarily modified according to user operations, it is possible to freely customize the pseudo object at any time according to the user's wishes or an interior design theme.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the respective embodiments above describe cases in which a display unit 12 is provided on an entire wall or ceiling, in a control system according to an embodiment of the present disclosure, a display unit 12 may be provided on at least part of a wall or ceiling.

Also, although the respective embodiments above describe cases in which a display unit 12 is provided on one wall or ceiling, in a control system according to an embodiment of the present disclosure, display units 12 may be provided on two or more surfaces, including the walls or the ceiling.

Also, although the respective embodiments above describe the case in which a display unit 12 is a touch panel display integrated with an operation input unit 14, in this case, the touch panel function may be switched on/off for individual designated areas of a touch panel display on an entire wall. For example, the touch panel function may be switched on only in an area in which touch operations by a user are anticipated, such as in an operating unit area of a pseudo object displayed on the display unit 12. In other areas, the touch panel function may be switched off.

Additionally, the present technology may also be configured as below.

(1) A display control device including:
a setting unit that sets a type and display position of a pseudo object;
an acquiring unit that acquires a parameter for implementing a function of the set pseudo object in one or more devices placed near the set display position; and
a display control unit that displays the pseudo object according to the parameter on a display unit, the display unit being one of the one or more devices.

(2) The display control device according to (1), wherein
the setting unit is capable of modifying a type and position of a pseudo object being displayed on a display unit.

(3) The display control device according to (1) or (2), wherein
the display control unit modifies a display position according to a position of a real object existing near the display unit, in a manner that the pseudo object to be displayed on the display unit does not overlap with the real object.

(4) The display control device according to any one of (1) to (3), wherein
the setting unit sets a size of the pseudo object.

(5) The display control device according to any one of (1) to (4), wherein
the one or more devices each include an audio output unit or an imaging unit.

(6) The display control device according to any one of (1) to (5), wherein
the pseudo object includes a display device, and
the display control unit, according to the parameter, places a playback screen of user-selected content on a display screen in an image of a pseudo display device.

(7) The display control device according to any one of (1) to (6), wherein
the one or more devices each have a display function and an audio output function,
the pseudo object includes an audio output device,
the display control unit displays an image of a pseudo audio output device on each of the one or more devices according to the parameter, and
the display control device further includes:
an audio control unit that conducts audio control to output audio from the one or more devices according to the parameter.

(8) The display control device according to any one of (1) to (7), wherein
the one or more devices each include a display function and an imaging function,
the pseudo object includes a mirror, and
the display control unit displays an image of a pseudo mirror on each of the one or more devices according to the parameter, and places a mirror image in a placement area of the pseudo mirror on the basis of a captured image captured with the imaging function.

(9) The display control device according to any one of (1) to (8), wherein
an operation detecting function is provided on a display screen of each of the one or more devices,
the pseudo object includes an operating device,
the display control unit displays an image of a pseudo operating device on each of the one or more devices according to the parameter, and
the display control device detects a user operation with respect to an image of a pseudo operating device with the operation detecting function, and applies control according to a detected user operation.

(10) The display control device according to any one of (1) to (9), wherein
the pseudo object includes a room interior, and
the display control unit displays an image of a pseudo room interior with perspective processing applied thereto on each of the one or more devices according to the parameter.

(11) The display control device according to any one of (1) to (10), wherein
  the pseudo object includes a window; and
  the display control unit displays an image of a pseudo window according to the parameter, and places an outdoor image within a window frame.
(12) The display control device according to any one of (1) to (11), wherein
  the pseudo object includes a lighting device, and
  the display control unit displays an image of a pseudo lighting device according to the parameter.
(13) The display control device according to any one of (1) to (12), wherein
  the pseudo object includes storage furniture, and
  the display control unit displays an image of pseudo storage furniture so as to correspond with a position of storage furniture that is a real object placed behind a display screen of each of the one or more devices.
(14) The display control device according to any one of (1) to (13), wherein
  the pseudo object includes a bulletin board, and
  the display control unit displays an image of a pseudo bulletin board according to the parameter, and places a user-selected still image or moving image within a bulletin board frame.
(15) The display control device according to any one of (1) to (14), wherein
  the function of the pseudo object indicates behavior similar to the object in a real world.
(16) A display control method including:
  setting a type and display position of a pseudo object;
  acquiring a parameter for implementing a function of the pseudo object in one or more devices placed near the display position; and
  applying control to display the pseudo object according to the parameter acquired in the acquiring step on a display unit, the display unit being one of the one or more devices.
(17) A non-transitory computer-readable recording medium having a program recorded thereon, the program causing a computer to function as:
  a setting unit that sets a type and display position of a pseudo object;
  an acquiring unit that acquires a parameter for implementing a function of the pseudo object in one or more devices placed near the display position; and
  a display control unit that applies control to display the pseudo object according to the parameter acquired by the acquiring unit on a display unit, the display unit being one of the one or more devices.

What is claimed is:

1. A display control device comprising:
  a setting unit, implemented via at least one processor, that sets a type of pseudo object and display position and size of the pseudo object;
  an acquiring unit, implemented via at least one processor, that acquires at least one display, audio, or mechanical parameter for implementing at least one function of the set type of pseudo object in one or more devices placed near the set display position of the pseudo object, wherein the one or more devices each have at least one of a display function and an audio output function;
  a display control unit, implemented via at least one processor, that displays the pseudo object of a first type including an image of a pseudo audio output device on the one or more devices having the audio output function and a pseudo operating device for initiating control of the at least one acquired parameter on a display unit, the display unit being one of the one or more devices; and
  an audio control unit, implemented via at least one processor, that initiates audio control of the at least one acquired parameter according to a user operation within an area of an operating element image on the displayed pseudo operating device, wherein
  the display control unit determines both a position and a size of at least one external real object existing near a front side of the display, and modifies the display position and size of the pseudo object according to the determined position and size of the external real object, in a manner that the displayed pseudo object does not overlap with the external real object;
  wherein the setting unit modifies the type and the display position of the pseudo object being displayed on a display unit,
  wherein the pseudo object of another type includes storage furniture, and the display control unit displays an image of pseudo storage furniture so as to correspond to a position and size of one or more elements of mechanical storage furniture embedded in a first state by being placed behind a display screen of at least one of the one or more devices, wherein the elements of mechanical storage furniture are opened on the front side of the display in a second state,
  wherein during opening of the mechanical storage furniture, a part of said pseudo storage furniture moves relative to another part of said pseudo storage furniture by having a portion of the display displaced relative to a non-overlapping remainder of the display.

2. The display control device according to claim 1, wherein
  the setting unit is capable of modifying the type and the display position of the pseudo object being displayed on a display unit.

3. The display control device according to claim 2, wherein
  the pseudo object of another set type includes a display device, and
  the display control unit, according to the at least one acquired parameter, places a playback screen of user-selected content on a display screen in an image of a pseudo display device.

4. The display control device according to claim 2, wherein
  the one or more devices each have the display function and an imaging function,
  the pseudo object of another type includes a mirror, and
  the display control unit displays an image of a pseudo mirror on each of the one or more devices according to the at least one acquired parameter, and places a mirror image in a placement area of the pseudo mirror on the basis of a captured image captured with the imaging function.

5. The display control device according to claim 2, wherein
  an operation detecting function is provided on a display screen of each of the one or more devices having the display function,
  the pseudo object of another type includes an operating device,
  the display control unit displays an image of the pseudo operating device on each of the one or more devices according to the at least one acquired parameter, and the display control device detects a user operation with respect to the image of the pseudo operating device with the operation detecting function, and applies control according to the detected user operation.

6. The display control device according to claim 2, wherein
the pseudo object of another type includes a window, and
the display control unit displays an image of a pseudo window according to the at least one acquired parameter, and places an outdoor image within a window frame.

7. The display control device according to claim 2, wherein
the pseudo object of another type includes a lighting device, and
the display control unit displays an image of a pseudo lighting device according to the at least one acquired parameter.

8. The display control device according to claim 2, wherein
the pseudo object of another type includes storage furniture, and
the display control unit displays an image of pseudo storage furniture so as to correspond with a position and size of one or more elements of mechanical storage furniture embedded in a first state by being placed behind a display screen of at least one of the one or more devices, wherein the elements of mechanical storage furniture are opened on the front side of the display in a second state according to the acquired mechanical parameter.

9. The display control device according to claim 1, wherein the one or more devices each include an imaging unit.

10. The display control device according to claim 1, wherein
the pseudo object includes a room interior, and
the display control unit displays an image of a pseudo room interior with perspective processing applied thereto on each of the one or more devices according to the at least one acquired parameter.

11. The display control device according to claim 1, wherein
the pseudo object of another type includes a bulletin board, and
the display control unit displays an image of a pseudo bulletin board according to the at least one acquired parameter, and places a user-selected still image or moving image within a bulletin board frame.

12. The display control device according to claim 1, wherein the user operation is a touch or gesture, and the display control unit modifies a display parameter of the pseudo operation device when the user operation is determined to be made within the area of the operating element image.

13. The display control device according to claim 12, wherein the user operation is determined to be separate from the at least one external real object, in a manner that the display position and size of the pseudo object is not modified by the user operation.

14. The display control device according to claim 1, wherein a user touch or gesture within one or more operating image areas of the pseudo object modify the at least one function in the one or more devices, wherein the user touch or gesture is determined to be separate from the at least one external real object, in a manner that the display position and size of the pseudo object is not modified by the user touch or gesture.

15. A display control method comprising:
setting a type of pseudo object and display position and size of the pseudo object;
acquiring at least one display, audio, or mechanical parameter for implementing at least one function of the set type of pseudo object in one or more devices placed near the display position of the pseudo object, wherein the one or more devices each have at least one of a display function and an audio output function;
applying control to display the pseudo object of a first type including an image of a pseudo audio output device on the one or more devices having the audio output function and a pseudo operating device for initiating control of the at least one acquired parameter on a display unit, the display unit being one of the one or more devices; and
initiating audio control of the at least one acquired parameter according to a user operation within an area of an operating element image on the displayed pseudo operating device,
wherein the applied display control is based on a determination of both position and size of at least one external real object existing near a front side of the display, and the display position and size of the pseudo object are modified according to the determined position and size of the external real object, in a manner that the displayed pseudo object does not overlap with the external real object;
wherein a setting unit modifies the type and the display position of the pseudo object being displayed on a display unit,
wherein the pseudo object of another type includes storage furniture, and a display control unit displays an image of pseudo storage furniture so as to correspond to a position and size of one or more elements of mechanical storage furniture embedded in a first state by being placed behind a display screen of at least one of the one or more devices, wherein the elements of mechanical storage furniture are opened on the front side of the display in a second state,
wherein during opening of the mechanical storage furniture, a part of said pseudo storage furniture moves relative to another part of said pseudo storage furniture by having a portion of the display displaced relative to a non-overlapping remainder of the display.

16. A non-transitory computer-readable recording medium having a program recorded thereon, the program causing a computer to function as:
a setting unit that sets a type of pseudo object and display position and size of the pseudo object; an acquiring unit that acquires at least one display, audio, or mechanical parameter for implementing at least one function of the type of pseudo object in one or more devices placed near the display position of the pseudo object, wherein the one or more devices each have at least one of a display function and an audio output function;
a display control unit that applies control to display the pseudo object of a first type including an image of a pseudo audio output device on the one or more devices having the audio output function and a pseudo operating device for initiating control of the at least one acquired the parameter on a display unit, the display unit being one of the one or more devices; and an audio control unit, implemented via at least one processor, that initiates audio control of the at least one acquired parameter according to a user operation within an area of an operating element image on the displayed pseudo operating device, wherein the display control unit determines both a position and a size of at least one external real object existing near a front side of the display, and modifies the display position and size of the pseudo object according to the determined position and size of the external real object, in a manner that the displayed pseudo object does not overlap with the external real object;

wherein the setting unit modifies the type and the display position of the pseudo object being displayed on a display unit, wherein the pseudo object of another type includes storage furniture, and the display control unit displays an image of pseudo storage furniture so as to correspond to a position and size of one or more elements of mechanical storage furniture embedded in a first state by being placed behind a display screen of at least one of the one or more devices, wherein the elements of mechanical storage furniture are opened on the front side of the display in a second state, wherein during opening of the mechanical storage furniture, a part of said pseudo storage furniture moves relative to another part of said pseudo storage furniture by having a portion of the display displaced relative to a non-overlapping remainder of the display.

* * * * *